United States Patent
Wan et al.

(10) Patent No.: US 12,423,261 B2
(45) Date of Patent: Sep. 23, 2025

(54) PCIe-BASED COMMUNICATIONS METHOD AND APPARATUS

(71) Applicant: SHENZHEN YINWANG INTELLIGENT TECHNOLOGIES CO., LTD., Shenzhen (CN)

(72) Inventors: Lei Wan, Beijing (CN); Jiezuo Zhu, Beijing (CN); Xuehuan Wang, Chengdu (CN); Pengxin Bao, Chengdu (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 33 days.

(21) Appl. No.: 17/895,769

(22) Filed: Aug. 25, 2022

(65) Prior Publication Data
US 2022/0405229 A1    Dec. 22, 2022

Related U.S. Application Data

(63) Continuation of application No. PCT/CN2020/077039, filed on Feb. 27, 2020.

(51) Int. Cl.
*G06F 13/42* (2006.01)
*G06F 12/02* (2006.01)
(Continued)

(52) U.S. Cl.
CPC ...... *G06F 13/4221* (2013.01); *G06F 12/0238* (2013.01); *G06F 13/1668* (2013.01); *G06F 13/4027* (2013.01)

(58) Field of Classification Search
CPC .......... G06F 13/42; G06F 13/40; G06F 13/16; G06F 12/02
See application file for complete search history.

(56) References Cited

U.S. PATENT DOCUMENTS 1,113,196 A * 10/1914 Conover ................. B21D 1/08
                                                  72/111
9,025,495 B1 * 5/2015 Brown ................. H04L 41/082
                                                  370/255
(Continued)

FOREIGN PATENT DOCUMENTS

| CN | 101436985 A | 5/2009 |
| CN | 101494587 A | 7/2009 |

(Continued)

OTHER PUBLICATIONS

Lin, "The FPGA Design and Implementation of High-speed DAC Based on the PCIE Bus," Thesis for the Master degree of Instrument and Meter Engineering, University of Electronic Science and Technology of China, May 20, 2013, 80 pages (with English abstract).

(Continued)

*Primary Examiner* — Henry Tsai
*Assistant Examiner* — Christopher A Daley
(74) *Attorney, Agent, or Firm* — Fish & Richardson P.C.

(57) ABSTRACT

A PCIe-based communications method includes: a root complex writes identity information of a second node into a first node and writes routing table information into a third node, where the first node is a source node of first data, the second node is a destination node of the first data, and the third node is a node through which the first data arrives at the second node.

19 Claims, 16 Drawing Sheets

(51) Int. Cl.
*G06F 13/16* (2006.01)
*G06F 13/40* (2006.01)

(56) References Cited

U.S. PATENT DOCUMENTS

| | | | |
|---|---|---|---|
| 9,146,890 B1* | 9/2015 | Brown | G06F 13/4022 |
| 10,067,900 B2* | 9/2018 | Watkins | G06F 13/4068 |
| 11,704,263 B2* | 7/2023 | Govindarajan | G06F 13/4221 |
| | | | 710/3 |
| 2008/0019361 A1 | 1/2008 | Suri | |
| 2009/0164694 A1* | 6/2009 | Talayco | G06F 13/4022 |
| | | | 710/316 |
| 2011/0138082 A1* | 6/2011 | Khatri | G06F 13/24 |
| | | | 710/52 |
| 2014/0281070 A1* | 9/2014 | Natu | G06F 13/385 |
| | | | 710/105 |
| 2015/0067229 A1* | 3/2015 | Connor | G06F 13/4022 |
| | | | 710/317 |
| 2017/0060800 A1 | 3/2017 | Watkins et al. | |
| 2017/0070363 A1 | 3/2017 | Watkins et al. | |
| 2017/0147456 A1* | 5/2017 | Lee | G06F 11/2033 |
| 2019/0102293 A1* | 4/2019 | Li | G06F 3/065 |
| 2019/0132198 A1* | 5/2019 | Li | G06F 9/30134 |
| 2020/0195469 A1* | 6/2020 | McLean | H04L 12/40091 |
| 2021/0374086 A1* | 12/2021 | Jose | G06F 13/4221 |
| 2022/0358075 A1* | 11/2022 | Wan | H04L 45/74 |
| 2022/0368564 A1* | 11/2022 | Wan | H04L 45/306 |

FOREIGN PATENT DOCUMENTS

| | | |
|---|---|---|
| CN | 103249106 A | 8/2013 |
| CN | 103561445 A | 2/2014 |
| CN | 109445905 A | 3/2019 |

OTHER PUBLICATIONS

Specification, Base, "PCI Express Base Specification Revision 5.0, Version 1.0," May 22, 2019, 1299 pages.

Office Action in Chinese Appln. No. 202080002612.8, dated Oct. 17, 2022, 6 pages (with English translation).

Office Action in Chinese Appln. No. 202080002612.8, dated Apr. 27, 2022, 30 pages (with English translation).

International Search Report and Written Opinion in International Appln. No. PCT/CN2020/077039, mailed on Nov. 27, 2020, 15 pages (with English translation).

* cited by examiner

PCIe-BASED COMMUNICATIONS METHOD AND APPARATUS

CROSS-REFERENCE TO RELATED APPLICATIONS

This application is a continuation of International Application No. PCT/CN2020/077039, filed on Feb. 27, 2020, the disclosure of which is hereby incorporated by reference in its entirety.

TECHNICAL FIELD

This application relates to the field of communication technologies, and in particular, to a communications method and apparatus based on peripheral component interconnect express (peripheral component interconnect express, PCIe).

BACKGROUND

Main composition units of a PCIe system include a root complex (root complex, Root), a switching node (switch), an endpoint (endpoint), and the like. The root complex is configured to manage all buses and all nodes in the PCIe system, and is a bridge for communication between nodes in the PCIe system. One PCIe system may include one or more switching nodes. The switching node is a data forwarding node in the PCIe system. One switching node may be connected to one or more of a root complex, another switching node, or an endpoint. The endpoint is an end device, for example, a peripheral (peripheral) device, and is configured to receive data from another node or the root complex, or send data to another node or the root complex.

In the PCIe system, only the root complex and a node (for example, an endpoint or a switching node) have permission to read configuration space of the node. Configuration space of a node stores information such as function information or an address of the node. If the current node is a storage device, no other node in the PCIe system has permission to read configuration space of the node. For example, for a node 1 in the PCIe system, only the root complex and the node 1 have permission to read configuration space of the node 1, and a node other than the node 1 in the PCIe system has no permission to read the configuration space of the node 1. This means that in the PCIe system, only the root complex can learn of information such as a function or an address of each node. Therefore, communication between endpoints, between switching nodes, and between an endpoint and a switching node cannot be implemented directly, but requires a root complex. Because communication between nodes in the PCIe system requires a root complex, complexity of communication between nodes is greatly increased.

SUMMARY

Embodiments of this application provide a PCIe-based communications method and apparatus, so that communication between nodes in a PCIe system does not use a root complex. This can reduce complexity of communication between the nodes.

According to a first aspect, an embodiment of this application provides a PCIe-based communications method, and the method includes: A root complex writes identity information of a second node into a first node, and writes routing table information into a third node, where the first node is a source node of first data, the second node is a destination node of the first data, and the third node is a node through which the first data arrives at the second node.

In a possible design, the method in the first aspect may be performed by the root complex, a chip in the root complex, or the like.

In this embodiment of this application, identity information of a destination node of data is written into a sending node (for example, the first node), so that the identity information of the destination node of the data can be carried when the sending node sends the data. Routing table information is written into an intermediate node (for example, the third node), so that when receiving the data, the intermediate node may determine a routing path based on the identity information of the destination node and the routing table information, and forward the data to the destination node (for example, the second node) based on the routing path. In this way, communication between endpoints, between switching nodes, and between an endpoint and a switching node in a PCIe system can be directly implemented without using a root complex. This can reduce complexity of communication between the nodes in the PCIe system.

In a possible design, the root complex determines that the first node supports a first working mode; or determines that the first node supports the first working mode and a second working mode, where the first working mode is a working mode in which communication between nodes does not use the root complex, and the second working mode is a working mode in which communication between nodes needs to use the root complex. In the foregoing design, when the first node supports only the first working mode, communication between nodes may not use the root complex. This reduces complexity of communication between nodes in the PCIe system. When the first node supports both the first working mode and the second working mode, communication between nodes may not use the root complex to reduce complexity of communication between nodes in the PCIe system, or communication may be performed in an existing communication manner. This is compatible.

In a possible design, when the first node is in the second working mode, the root complex configures a first memory address for the first node, where the first memory address is a physical address in running memory corresponding to a central processing unit (central processing unit, CPU) to which local memory space of the first node is mapped. In the foregoing design, the first memory address is configured for the first node, so that the first node can perform communication in an existing communication manner, achieving compatibility between the two working modes.

In a possible design, the root complex determines that the third node supports the first working mode; or determines that the third node supports the first working mode and the second working mode, where the first working mode is a working mode in which communication between nodes does not use the root complex, and the second working mode is a working mode in which communication between nodes needs to use the root complex. In the foregoing design, when the third node supports only the first working mode, communication between nodes may not use the root complex. This reduces complexity of communication between nodes in the PCIe system. When the third node supports both the first working mode and the second working mode, communication between nodes may not use the root complex to reduce complexity of communication between nodes in the PCIe system, or communication may be performed in an existing communication manner. This is compatible.

In a possible design, when the third node is in the second working mode, the root complex configures a second memory address for the third node, where the second memory address is a physical address in the running memory corresponding to the CPU to which local memory space of the third node is mapped. In the foregoing design, the second memory address is configured for the third node, so that the third node can perform communication in an existing communication manner, achieving compatibility between the two working modes.

In a possible design, the root complex writes identity information of the first node into the first node. In the foregoing design, the identity information of the first node is written into the first node, so that the identity information of the first node may be sent to a destination node of data. In this way, the destination node may determine information about a source node of the data, and may further verify the received data to determine whether the received data is data sent to the node.

In a possible design, the root complex writes identity information of the third node into the third node. In the foregoing design, the identity information of the third node is written into the third node, so that the identity information of the third node may be sent to a destination node of data. In this way, the destination node may determine information about a source node of the data, and may further verify the received data to determine whether the received data is data sent to the node.

In a possible design, the identity information is a bus, device, and function number (bus, device and function number, BDF) or an identity (identity, ID) number. In the foregoing design, identity information may be a unique BDF allocated by the root complex to a node, or a unique ID number re-allocated by the root complex to a node, so that identity information of each node is unique.

According to a second aspect, an embodiment of this application provides a PCIe-based communications method, and the method includes: A first node determines identity information of a second node based on information stored in the first node, and sends a first transaction layer packet (transaction layer packet, TLP) to a third node, where the second node is a destination node of first data, and the first TLP includes the first data and the identity information of the second node.

In a possible design, the first node may be an endpoint or a bridge node, the second node may be an endpoint or a bridge node, and the third node may be a bridge node.

In this embodiment of this application, a sending node (for example, the first node) determines identity information of a receiving node (for example, the second node) based on stored information, and then encapsulates and sends the first data and the identity information of the receiving node to an intermediate node (for example, the third node), so that the intermediate node forwards the first data to the receiving node. In this way, communication between endpoints, between switching nodes, and between an endpoint and a switching node in a PCIe system can be directly implemented without using a root complex. This can reduce complexity of communication between the nodes in the PCIe system.

In a possible design, the stored information may be configured by the root complex or another network node.

In a possible design, the first node supports a first working mode, and the first working mode is a working mode in which communication between nodes does not use the root complex. In the foregoing design, the first node supports the first working mode, so that communication between nodes does not use the root complex. This reduces complexity of communication between the nodes in the PCIe system.

In a possible design, the first node supports a first working mode and a second working mode, where the first working mode is a working mode in which communication between nodes does not use the root complex, and the second working mode is a working mode in which communication between nodes needs to use the root complex. In the foregoing design, the first node supports both the first working mode and the second working mode, so that communication between nodes does not use the root complex to reduce complexity of communication between nodes in the PCIe system, or communication may be performed in an existing communication manner, achieving compatibility between the two working modes.

In a possible design, the stored information further includes identity information of the first node. In the foregoing design, the information stored in the first node includes the identity information of the first node, and the identity information of the first node may be sent to a destination node of data. In this way, the destination node may determine information about a source node of the data, and may further verify the received data to determine whether the received data is data sent to the node.

In a possible design, the first TLP further includes the identity information of the first node. In the foregoing design, the first data and the identity information of the first node are encapsulated into the first TLP, and the first TLP is sent to the destination node, so that the destination node can determine information about a source node of the data.

In a possible design, the identity information is a BDF or an ID number. In the foregoing design, identity information may be a unique BDF allocated by the root complex to a node, or a unique ID number re-allocated by the root complex to a node, so that identity information of each node is unique.

According to a third aspect, an embodiment of this application provides a PCIe-based communications apparatus. The apparatus may be a communications device, or may be a chip or a chipset in a communications device. The communications device may be either of a root complex and a first node. In other words, the communications device may be a root complex, an endpoint, or a switching node. The apparatus may include a processing unit. When the apparatus is a communications device, the processing unit may be a processor. The apparatus may further include a transceiver module and a storage module, and the storage module may be a memory. The storage module is configured to store instructions. The processing unit executes the instructions stored in the storage module, so that the root complex performs a corresponding function in the first aspect, or the processing unit executes the instructions stored in the storage module, so that the first node performs a corresponding function in the second aspect. When the apparatus is a chip or a chipset in a communications device, the processing unit may be a processor, and the transceiver unit may be an input/output interface, a pin, a circuit, or the like. The processing unit executes instructions stored in a storage module, so that the root complex performs a corresponding function in the first aspect, or the processing unit executes instructions stored in a storage module, so that the first node performs a corresponding function in the second aspect. The storage module may be a storage module (for example, a register or a cache) in the chip or the chipset, or may be a storage module (for example, a read-only memory or a random access memory) that is in the network device and that is located outside the chip or the chipset.

According to a fourth aspect, an embodiment of this application provides a PCIe-based communications apparatus, and the apparatus includes a processor, and may further include a communications interface and/or a memory. The communications interface is configured to transmit information, and/or a message, and/or data between the apparatus and another apparatus. The memory is configured to store computer-executable instructions. When the apparatus runs, the processor executes the computer-executable instructions stored in the memory, so that the apparatus performs the communications method in any one of the first aspect or the designs of the first aspect, or any one of the second aspect or the designs of the second aspect.

According to a fifth aspect, an embodiment of this application further provides a computer-readable storage medium. The computer-readable storage medium is configured to store computer instructions. When the computer instructions are run on a computer, the computer is enabled to perform the communications method in any one of the first aspect or the possible designs of the first aspect, or any one of the second aspect or the possible designs of the second aspect.

According to a sixth aspect, this application further provides a computer program product including instructions. The computer program product is configured to store computer instructions. When the computer instructions are run on a computer, the computer is enabled to perform the communications method in any one of the first aspect or the possible designs of the first aspect, or any one of the second aspect or the possible designs of the second aspect.

According to a seventh aspect, this application further provides a PCIe system. The system includes a first node, a second node, and a third node. For example, the first node is an endpoint, the second node is a switching node, and the third node is an endpoint. The first node may perform a corresponding function in the first aspect, and the second node may perform a corresponding function in the second aspect.

According to an eighth aspect, an embodiment of this application provides a chip. The chip includes at least one processor and a communications interface. The processor is coupled to a memory, and is configured to read a computer program stored in the memory, to perform the communications method in any one of the first aspect or the designs of the first aspect, or any one of the second aspect or the designs of the second aspect in embodiments of this application.

According to a ninth aspect, an embodiment of this application provides a chip. The chip includes a communications interface and at least one processor. The processor runs to perform the communications method in any one of the first aspect or the possible designs of the first aspect, or any one of the second aspect or the possible designs of the second aspect in embodiments of this application.

BRIEF DESCRIPTION OF DRAWINGS

FIG. 17 is a schematic diagram of a structure of another TLP header according to an embodiment of this application; and FIG. 18 is a schematic diagram of a structure of another TLP header according to an embodiment of this application.

DESCRIPTION OF EMBODIMENTS

To make the objectives, technical solutions, and advantages of embodiments of this application clearer, the following further describes embodiments of this application in detail with reference to the accompanying drawings.

It should be noted that, "a plurality of" in embodiments of this application means two or more. In view of this, "a plurality of" in embodiments of this application may also be understood as "at least two". "At least one" may be understood as one or more, for example, one, two, or more. For example, "include at least one" means "include one, two, or more", and there is no limitation on which is included. For example, "include at least one of A, B, and C" may mean "include A, B, or C", "include A and B, A and C, or B and C", or "include A, B, and C". The term "and/or" describes an association relationship for describing associated objects and represents that three relationships may exist. For example, A and/or B may represent the following three cases: Only A exists, both A and B exist, and only B exists. In addition, the character "/" generally indicates an "or" relationship between the associated objects, unless otherwise specified.

Unless otherwise specified, ordinal numbers such as "first" and "second" in embodiments of this application are used to distinguish between a plurality of objects, and are not intended to limit a sequence, a time sequence, priorities, or importance of the plurality of objects.

For ease of understanding by a person skilled in the art, the following first describes a PCIe system in embodiments of this application with reference to the accompanying drawings.

Figure 1:
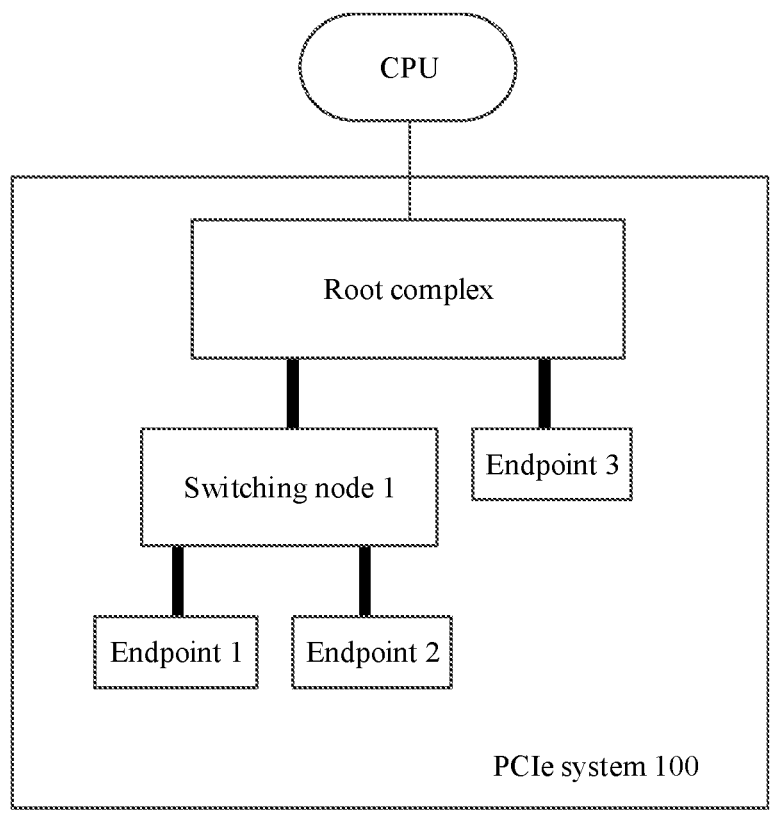
FIG. 1 is a schematic diagram of an architecture of a PCIe system according to an embodiment of this application.

PCIe is a high-speed short-range communications interface widely used in devices such as computers and test instruments. PCIe can quickly read and write memory and support large-bandwidth communication. Some automotive enterprises extend a transmission distance of PCIe and use PCIe as a large-data-amount communications interface on an intra-vehicle network. FIG. 1 is a schematic diagram of a structure of a PCIe system according to an embodiment of this application. As shown in FIG. 1, the PCIe system may include one root complex (a root complex shown in FIG. 1), at least one switching node (a switching node 1 in FIG. 1), and at least one endpoint (an endpoint 1, an endpoint 2, and an endpoint 3 in FIG. 1).

The root complex is responsible for managing all buses (shown by bold black lines in FIG. 1), switching nodes, and endpoints in the PCIe system 100, is a bridge for communication between nodes in the PCIe system 100, and is also a bridge for communication between each node and a CPU in the PCIe system 100. A switching node is used as a bridge to connect one or more of a root complex, another switching node, and an endpoint, and is a node for forwarding data. For example, the switching node 1 connects the root complex, the endpoint 1, and the endpoint 2. An endpoint is an end device, for example, a peripheral device, and is responsible for sending data or receiving data.

It should be noted that an interface between the CPU and the root complex is not PCIe, and does not belong to the PCIe system 100. The CPU may establish a connection relationship with an entity (for example, a computer device or a vehicle) in which the PCIe system 100 is located, or may be located in a same entity as the PCIe system 100, is configured to receive data sent by each node in the PCIe system 100, and may further process the received data, for example, perform format conversion and image rendering.

One device (for example, the root complex, the switching node 1, the endpoint 1, the endpoint 2, or the endpoint 3) in the PCIe system 100 can support a maximum of eight functions (function), for example, audio and video functions. A bridge node is configured to connect other devices. When a device supports a plurality of functions, each function of the device has its own configuration space, and the configuration space stores information about the function. The configuration space may be an independent storage unit of the device. For example, a size of the configuration space may be 256K. The root complex has permission to read and write configuration space of each device in the PCIe system 100. For example, the root complex may obtain, by reading information in configuration space of the endpoint 1, information about a function supported by the endpoint 1. For another example, the root complex may further complete initialization and configuration of the endpoint 1 by writing the configuration space of the endpoint 1. A device other than the root complex and a function of the device can view information about only their own configuration space.

Figure 2:
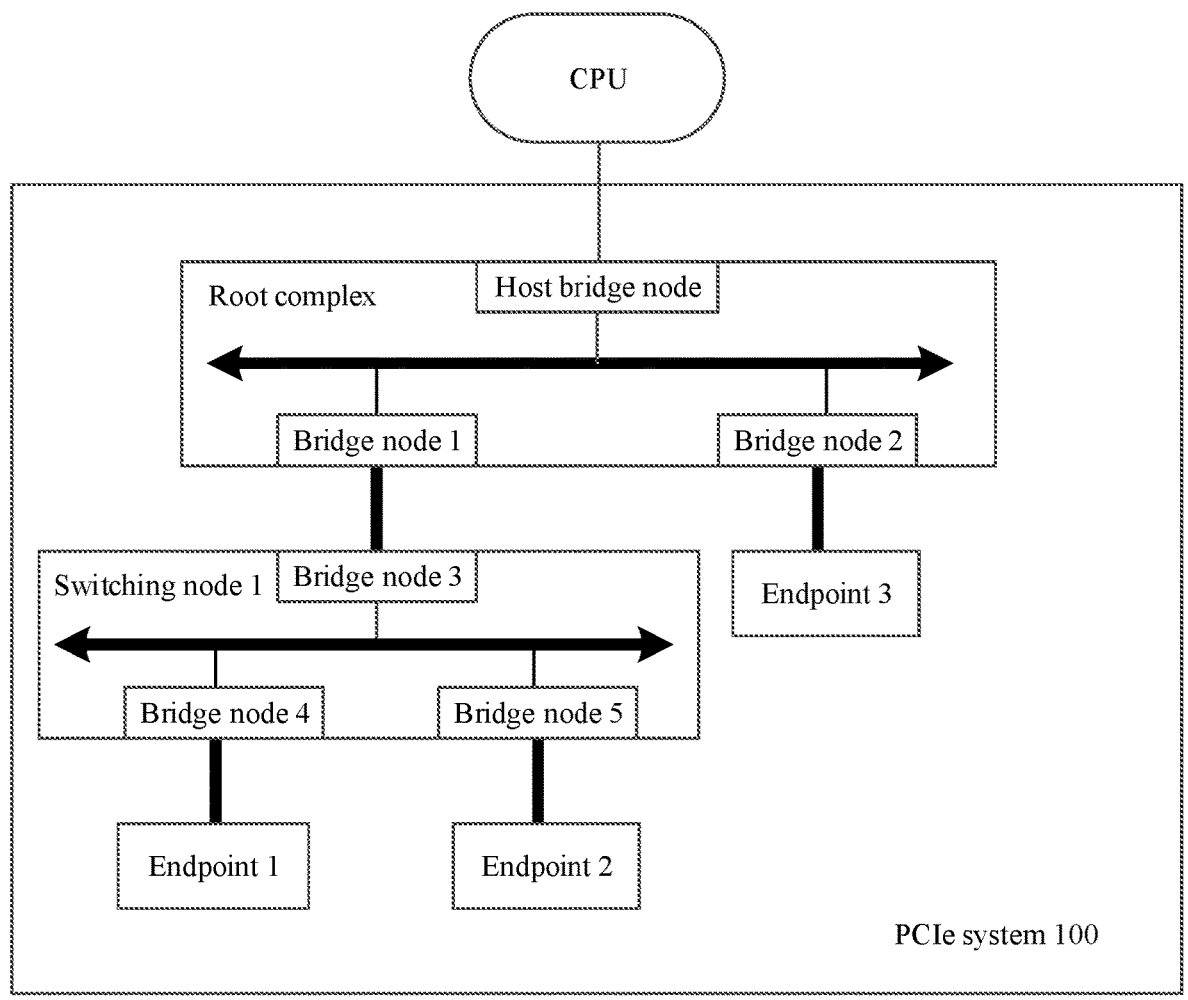
FIG. 2 is a schematic diagram of an architecture of another PCIe system according to an embodiment of this application.

FIG. 2 is a schematic diagram of another structure of a PCIe system 100. As shown in the figure, functions supported by a root complex include a host bridge (host bridge) node, a bridge node 1, and a bridge node 2. The host bridge node, the bridge node 1, and the bridge node 2 establish a connection relationship with each other through a bus (shown by a bold black line in FIG. 2). Functions supported by a switching node 1 include a bridge node 3, a bridge node 4, and a bridge node 5. The bridge node 3, the bridge node 4, and the bridge node 5 establish a connection relationship with each other through a bus. The host bridge node is configured to establish a connection relationship with a CPU, the bridge node 1 establishes a connection relationship with the bridge node 3 in the switching node 1 through a bus, the bridge node 2 establishes a connection relationship with an endpoint 3 through a bus, the bridge node 4 establishes a connection relationship with an endpoint 1 through a bus, and the bridge node 5 establishes a connection relationship with an endpoint 2 through a bus.

Figure 3:
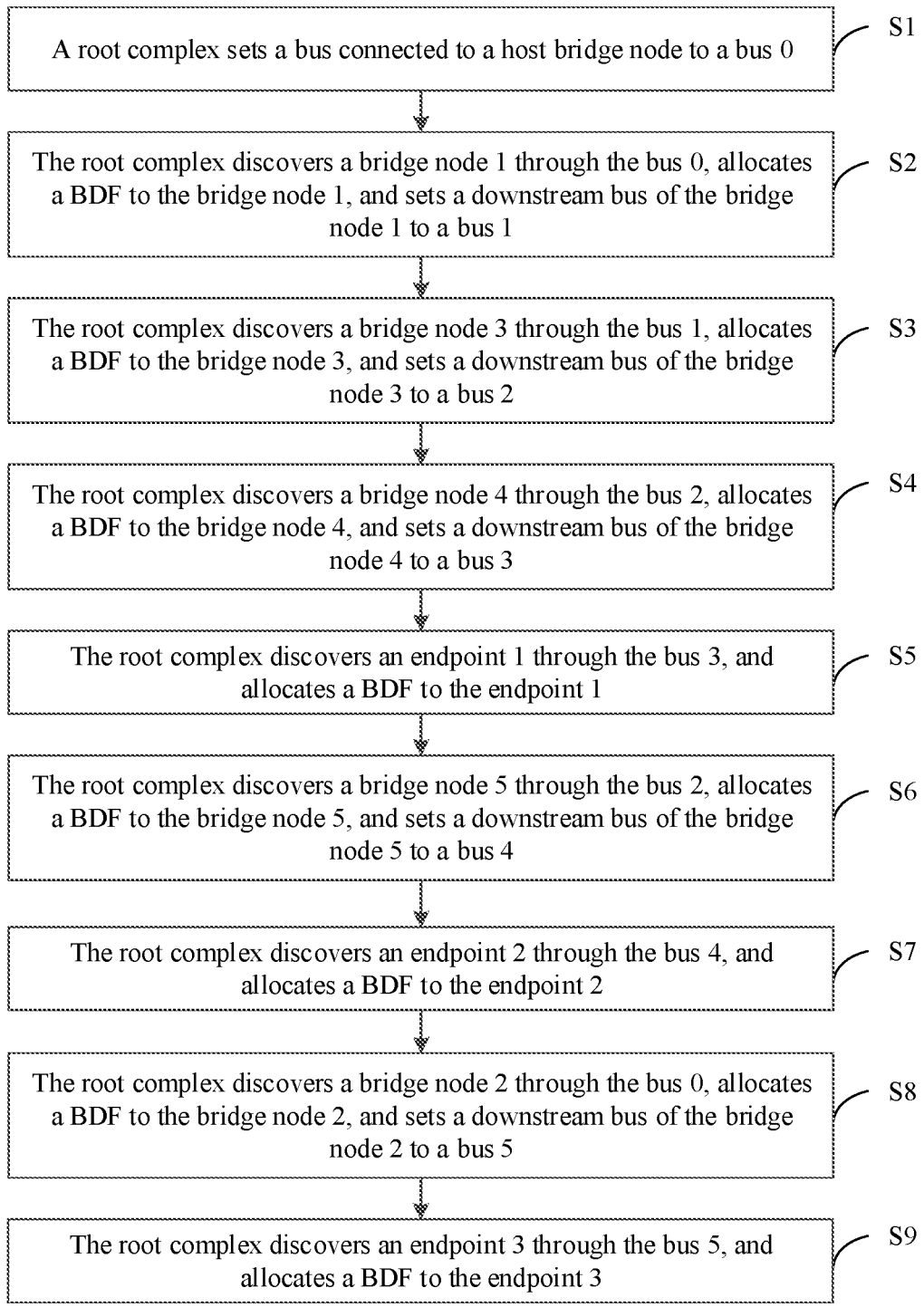
FIG. 3 is a schematic flowchart of BDF allocation according to an embodiment of this application.

When the PCIe system 100 is initialized, the root complex needs to enumerate and traverse buses, devices, and functions in the devices in the PCIe system 100, to complete initialization and configuration of each device. FIG. 3 is a schematic flowchart in which a root complex allocates a BDF.

S1: The root complex sets a bus connected to a host bridge node to a bus 0.

S2: The root complex discovers a bridge node 1 through the bus 0, allocates a bus, device, and function number (bus device and function number, BDF) to the bridge node 1, and sets a downstream bus of the bridge node 1 as a bus 1.

The root complex traverses nodes connected to the bus 0, discovers the bridge node 1 first, then traverses, according to a depth-first rule, nodes connected to the downstream bus of the bridge node 1, and sets the bus to the bus 1. In addition, the root complex allocates the BDF to the bridge node 1. For a switching node (or a bridge node), a bus number of the switching node (or the bridge node) includes an upstream bus number of the switching node (or the bridge node), a downstream bus number of the switching node (or the bridge node), and a maximum bus number of a branch in which the switching node (or the bridge node) is located. An upstream bus of the bridge node 1 is the bus 0, and a downstream bus number of the bridge node 1 is the bus 1. Because a branch in which the bridge node 1 is located is not completely traversed, a maximum bus number of the branch in which the bridge node 1 is located cannot be determined. The maximum bus number of the branch in which the bridge node 1 is located may be temporarily set to 0xFF, and bus numbers of the bridge node 1 may be 0, 1, and 0xFF.

It should be noted that, for a switching node (or a bridge node), after a BDF is allocated to the switching node (or the bridge node), the root complex writes a bus number (bus number) in the BDF into the switching node (or the bridge node), so that the switching node (or the bridge node) performs ID routing based on the bus number. For example, the root complex may write the bus number into configuration space of the switching node (or the bridge node). For another example, after the switching node (or the bridge node) receives data, the root complex may determine, based on the bus number and a bus number of a destination node, a next-hop node for forwarding the data. For a specific implementation of performing routing based on the bus number, refer to the conventional technology, and details are not described herein.

S3: The root complex discovers a bridge node 3 through the bus 1, allocates a BDF to the bridge node 3, and sets a downstream bus of the bridge node 3 to a bus 2.

The root complex traverses the nodes connected to the bus 1, discovers the bridge node 3, then traverses, according to a depth-first rule, nodes connected to the downstream bus of the bridge node 3, and sets the bus to the bus 2. In addition, the root complex allocates the BDF to the bridge node 3, and bus numbers of the bridge node 3 may be 1, 2, and 0xFF.

S4: The root complex discovers a bridge node 4 through the bus 2, allocates a BDF to the bridge node 4, and sets a downstream bus of the bridge node 4 to a bus 3.

The root complex traverses the nodes connected to the bus 2, discovers the bridge node 4 first, then traverses, according to a depth-first rule, nodes connected to the downstream bus of the bridge node 4, and sets the bus to the bus 3. In addition, the root complex allocates the BDF to the bridge node 4, and bus numbers of the bridge node 4 may be 2, 3, and 0xFF.

S5: The root complex discovers an endpoint 1 through the bus 3, and allocates a BDF to the endpoint 1.

The root complex traverses the nodes connected to the bus 3, and discovers the endpoint 1. Then, the root complex allocates the BDF to the endpoint 1. For an endpoint (or a function of the endpoint), a bus number of the endpoint (or the function of the endpoint) includes an upstream bus number of the endpoint (or the function of the endpoint). An upstream bus of the endpoint 1 is the bus 3, and therefore a bus number of the endpoint 1 may be 3.

It should be noted that, for an endpoint (or a function of the endpoint), after a BDF is allocated to the endpoint (or the function of the endpoint), the root complex does not write the BDF of the endpoint (or the function of the endpoint) into the endpoint (or the function of the endpoint). The BDF of the endpoint (or the function of the endpoint) is managed by the root complex, and the endpoint (or the function of the endpoint) does not know its own BDF.

In this way, a branch in which the bridge node 4 is located is traversed completely. The root complex determines that a maximum bus number of the branch in which the bridge node 4 is located is 3, and updates a bus number of each node in the branch in which the bridge node 4 is located. After the update, bus numbers of the bridge node 4 are 2, 3, and 3, and a bus number of the endpoint 1 is 3.

S6: The root complex discovers a bridge node 5 through the bus 2, allocates a BDF to the bridge node 5, and sets a downstream bus of the bridge node 5 to a bus 4.

After traversing the branch in which the bridge node 4 is located, the root complex discovers the bridge node 5 through the bus 2, then traverses, according to a depth-first rule, nodes connected to the downstream bus of the bridge node 5, and sets the bus to the bus 4. In addition, the root complex allocates the BDF to the bridge node 5, and bus numbers of the bridge node 5 may be 2, 4, and 0xFF.

S7: The root complex discovers an endpoint 2 through the bus 4, and allocates a BDF to the endpoint 2.

The root complex traverses the nodes connected to the bus 4, and discovers the endpoint 2. Then, the root complex allocates the BDF to the endpoint 2. A bus number of the endpoint 2 may be 4.

In this way, a branch in which the bridge node 5 is located is traversed completely. The root complex determines that a maximum bus number of the branch in which the bridge node 5 is located is 4, and updates a bus number of each node in the branch in which the bridge node 5 is located. After the update, bus numbers of the bridge node 1 are 0, 1, and 4; bus numbers of the bridge node 3 are 1, 2, and 4; bus numbers of the bridge node 5 are 2, 4, and 4; and the bus number of the endpoint 2 is 4.

S8: The root complex discovers a bridge node 2 through the bus 0, allocates a BDF to the bridge node 2, and sets a downstream bus of the bridge node 2 to a bus 5.

After traversing the branch in which the bridge node 1 is located, the root complex discovers the bridge node 2 through the bus 0, then traverses, according to a depth-first rule, nodes connected to the downstream bus of the bridge node 2, and sets the bus to the bus 5. In addition, the root complex allocates the BDF to the bridge node 2, and bus numbers of the bridge node 2 may be 0, 5, and 0xFF.

S9: The root complex discovers an endpoint 3 through the bus 5, and allocates a BDF to the endpoint 3.

The root complex traverses the nodes connected to the bus 5, and discovers the endpoint 2. Then, the root complex allocates the BDF to the endpoint 2. A bus number of the endpoint may be 5.

In this way, a branch in which the bridge node 2 is located is traversed completely. The root complex determines that a maximum bus number of the branch in which the bridge node 2 is located is 5, and updates a bus number of each node in the branch in which the bridge node 2 is located. After the update, bus numbers of the bridge node 2 are 0, 5, and 5, and a bus number of the endpoint 2 is 5.

In the process shown in FIG. 3, the root complex may allocate a BDF to each node in the PCIe system 100, and write a bus number of a switching node (or a bridge node) into the switching node (or the bridge node) to perform ID routing.

Figure 4:
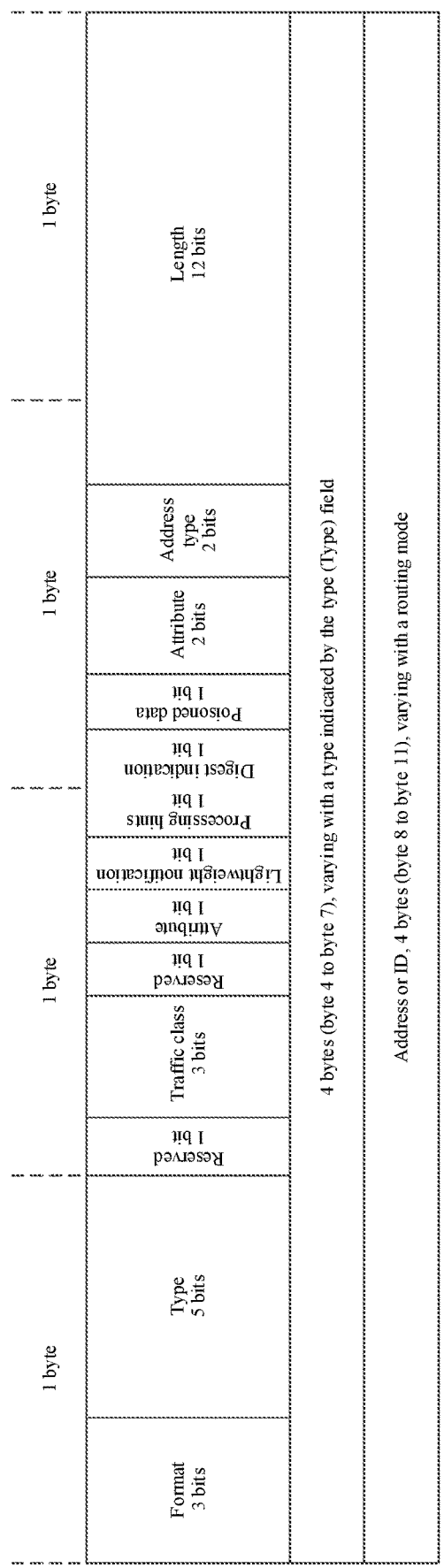
FIG. 4 is a schematic diagram of a structure of a TLP header according to an embodiment of this application.
Figure 5:
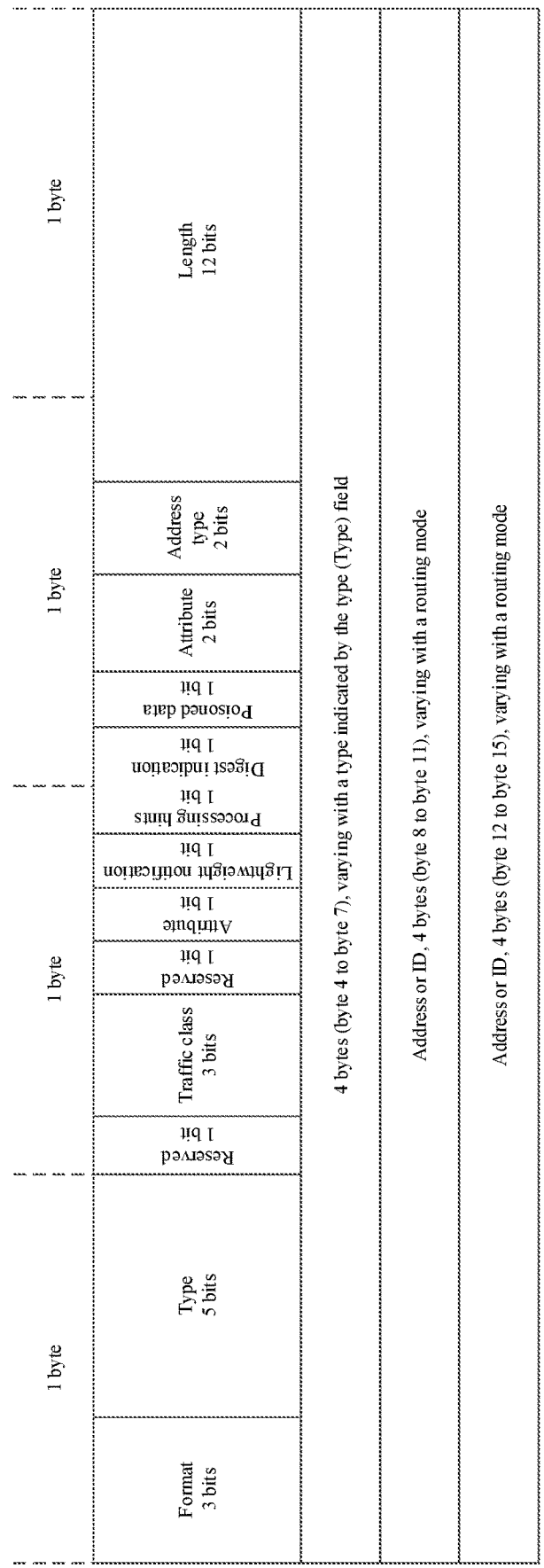
FIG. 5 is a schematic diagram of a structure of another TLP header according to an embodiment of this application.

In a PCIe system, nodes transmit data to each other through a PCIe interface. In a PCIe protocol, a data packet used to transmit data is referred to as a transaction layer packet (transaction layer packet, TLP). The PCIe system supports three routing modes for communication: address routing, identity (identity, ID) routing, and implicit routing. A routing address filled in a TLP header (TLP Header) varies with a routing mode. When a length of the TLP header is 12 bytes (Byte), fields related to the routing mode are a byte 8 to a byte 11, as shown in FIG. 4. When a length of the TLP header is 16 bytes, fields related to the routing mode are a byte 8 to a byte 15, as shown in FIG. 5.

The following separately describes the three routing modes supported by the PCIe system.

Figure 6:
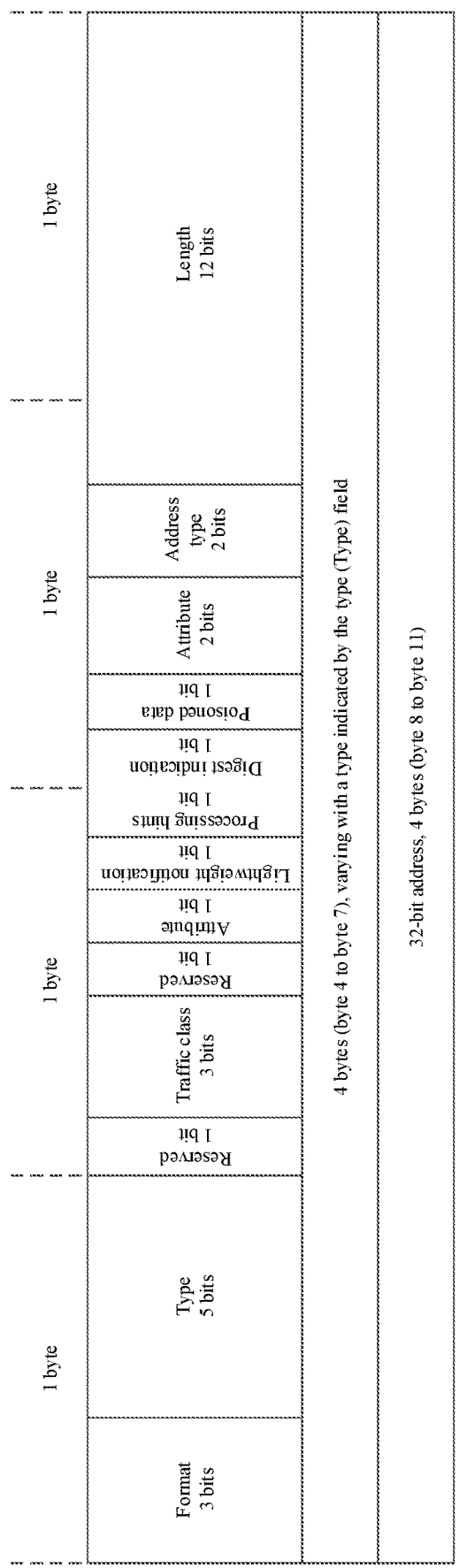
FIG. 6 is a schematic diagram of a structure of another TLP header according to an embodiment of this application.
Figure 7:
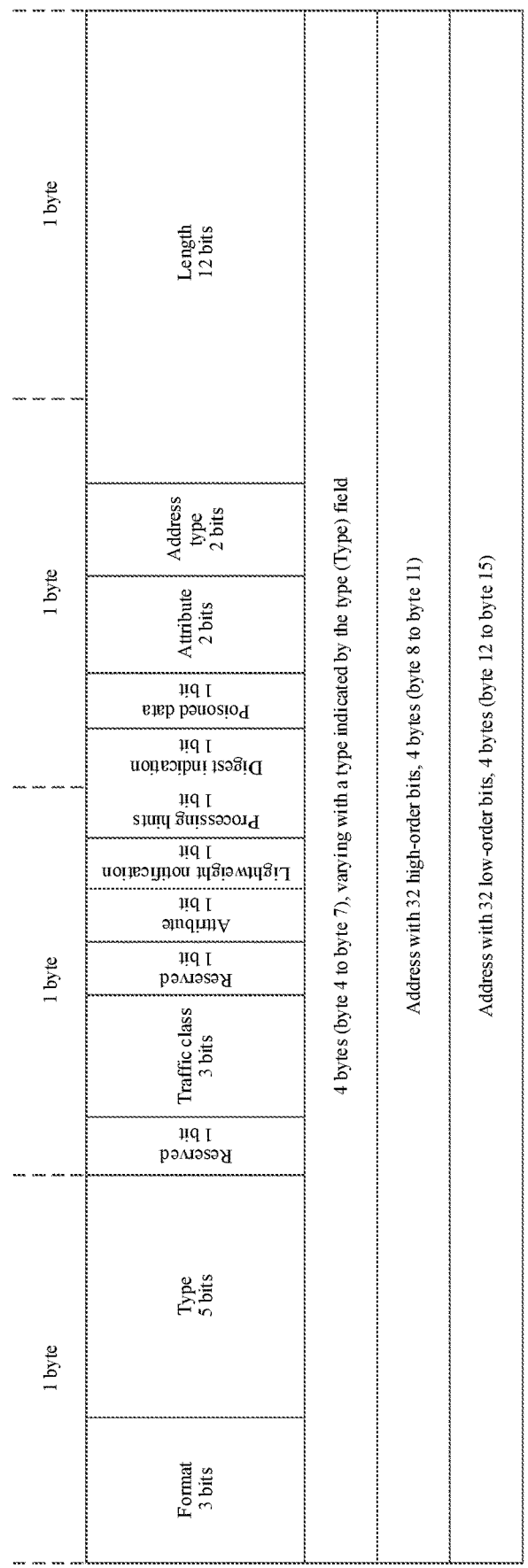
FIG. 7 is a schematic diagram of a structure of another TLP header according to an embodiment of this application.

(1) Address routing refers to routing based on a memory address. The memory address is a physical address in running memory corresponding to a CPU to which local memory space of a node is mapped. Memory addresses include a 32-bit memory address and a 64-bit memory address. Different memory addresses require different TLP headers. For example, the 32-bit memory address requires a TLP header with a length of 12 bytes. A byte 8 to a byte 11 in the TLP header are used to indicate the 32-bit memory address, as shown in FIG. 6. For another example, the 64-bit memory address requires a TLP header with a length of 16 bytes. A byte 8 to a byte 11 in the TLP header are used to indicate a memory address with 32 high-order bits, and a byte 12 to a byte 15 in the TLP header are used to indicate a memory address with 32 low-order bits, as shown in FIG. 7.

A memory address of a node in the PCIe system is configured by a root complex, and is written into a register (for example, a bar) of each node. A node in the PCIe system has local memory space, and the local memory space is open to the CPU. However, the CPU can directly access only the running memory corresponding to the CPU, but cannot directly access the local memory space of the node. Therefore, the root complex may map the local memory space of the node to the running memory corresponding to the CPU to obtain the memory address, so that the root complex can access the local memory space of the node based on the memory address. In this way, communication between the root complex and the node is implemented.

When the address routing is used, routing table information of a switching node (or a bridge node) is a running memory range corresponding to the CPU, and the running memory range corresponding to the CPU covers memory addresses of all nodes mounted to the switching node (or the bridge node). The memory address of the mounted node is known by only the mounted node and the root complex. A mapping relationship between local memory space of the mounted node and the running memory corresponding to the CPU is known by only the root complex, and is not known by the switching node (or the bridge node). Therefore, when data is transmitted between two nodes through a switching node (or a bridge node), the switching node (or the bridge node) does not know a specific mounted node to which the data is to be forwarded. Therefore, communication between the two nodes that needs to use the switching node (or the bridge node) requires the root complex. Therefore, the address routing supports only a case in which data is sent from the root complex to a node, or a case in which data is sent from a node to the root complex. Communication between nodes requires the root complex.

Figure 8:
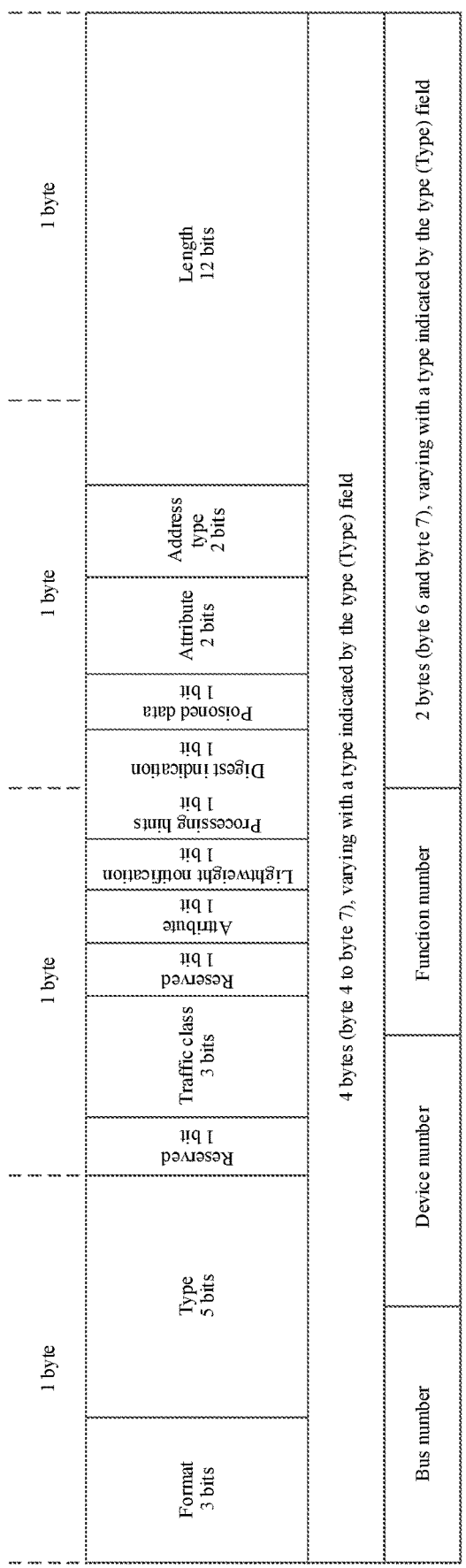
FIG. 8 is a schematic diagram of a structure of another TLP header according to an embodiment of this application.
Figure 9:
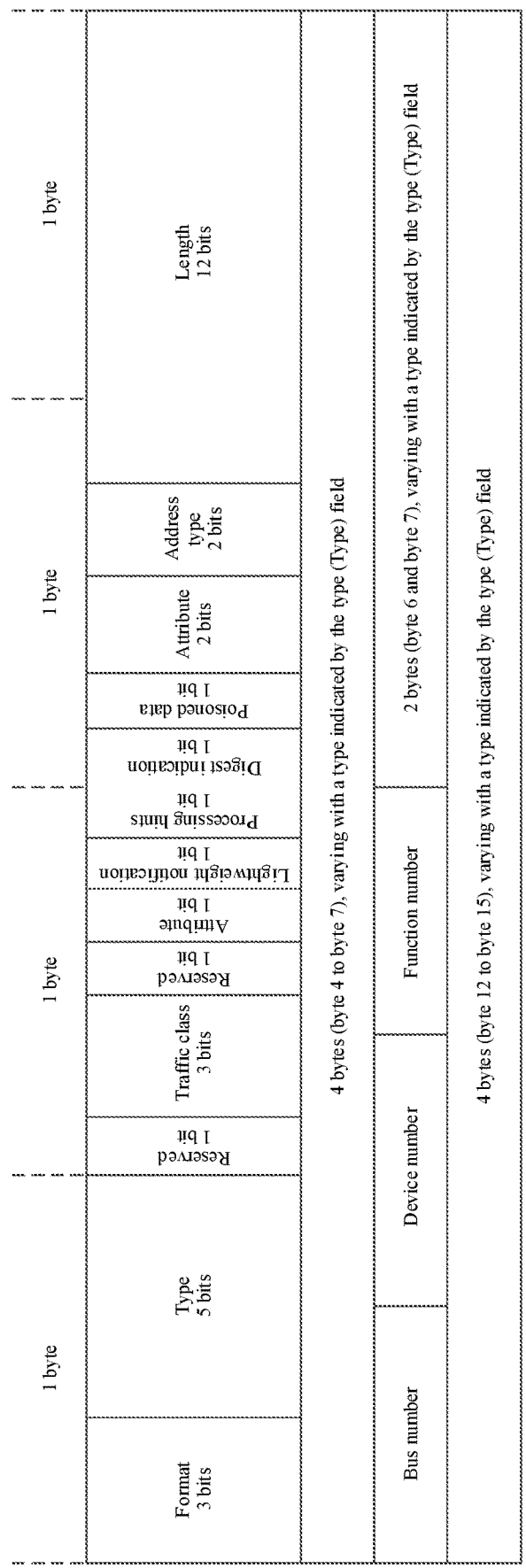
FIG. 9 is a schematic diagram of a structure of another TLP header according to an embodiment of this application.

(2) ID routing refers to routing based on a BDF. The ID routing mode includes two types of TLP headers. For example, a TLP header with a length of 12 bytes may be used, and some bytes in a byte 8 to a byte 11 in the TLP header are used to indicate a BDF, as shown in FIG. 8. For another example, a TLP header with a length of 16 bytes may be used, and some bytes in a byte 8 to a byte 11 in the TLP header are used to indicate a BDF, as shown in FIG. 9. A BDF of each node is a BDF configured by a root complex for the node. Only the root complex knows the BDF of the node, and the node or another node does not know the BDF. The ID routing mode is usually used for only a case in which the root complex sends a configuration message to a node and the node sends a configuration response message to the root complex. Therefore, the ID routing supports only communication from the root complex to a node, or communication from a node to the root complex. The ID routing mode does not support communication between nodes.

(3) Implicit routing refers to a routing mode other than address routing and ID routing. The implicit routing is used to send data to a root complex. A TLP sent by a node is sent to the root complex by default, and the TLP is forwarded to the root complex by default. Therefore, the implicit routing is used for only communication from a node to the root complex.

In the three routing modes supported by the current PCIe system, direct communication cannot be implemented between endpoints, between switching nodes, or between an endpoint and a switching node. If two nodes need to communicate with each other, a root complex is required. A working mechanism in which communication between nodes in the PCIe system requires a root complex greatly increases complexity of communication between nodes in the PCIe system. As shown in FIG. 1 or FIG. 2, although the endpoint 1 and the endpoint 2 are connected to the switching node 1, the endpoint 1 and the endpoint 2 cannot directly communicate with each other through the switching node 1. The endpoint 1 needs to first communicate with the root complex, to discover the endpoint 2 through the root complex; or the endpoint 2 needs to first communicate with the root complex, to discover the endpoint 1 through the root complex. For example, a specific process in which the endpoint 1 sends data to the endpoint 2 may be as follows: The endpoint 1 sends the data to the switching node 1, the switching node 1 sends the data to the root complex, and the root complex sends the data to the endpoint 2 through the switching node 1.

In view of this, embodiments of this application provide a PCIe-based communications method and apparatus, so that communication between nodes in a PCIe system does not use a root complex. This can reduce complexity of communication between the nodes in the PCIe system.

Figure 10:
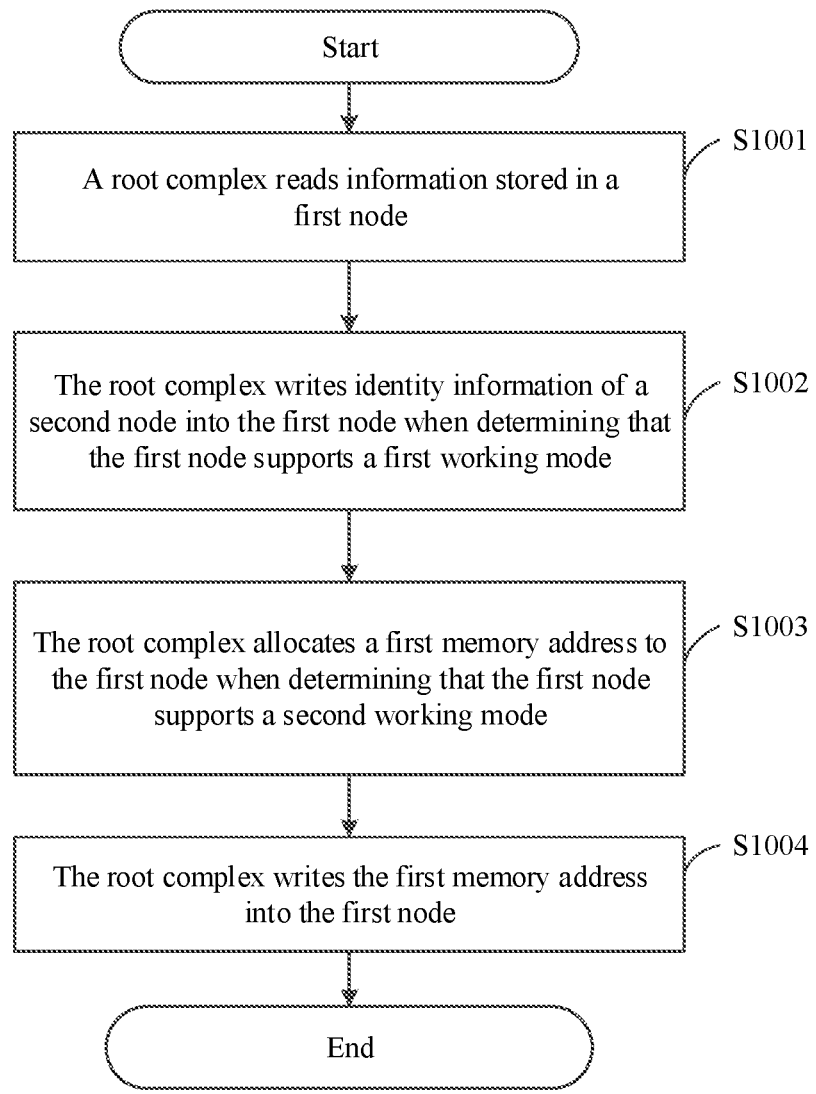
FIG. 10 is a schematic flowchart of a PCIe-based communications method according to an embodiment of this application.

FIG. 10 is a flowchart of a PCIe-based communications method according to an embodiment of this application. The method may be applied to a PCIe system in an intra-vehicle network, especially an intra-vehicle network of an autonomous vehicle, and certainly may also be applied to a PCIe system of another device. For example, the method may be applied to the PCIe system 100 shown in FIG. 1 or FIG. 2. The following describes the method by using an example in which the method is applied to a root complex in the PCIe system 100.

S1001: The root complex reads information stored in a first node.

In specific implementation, the root complex may read, when the PCIe system 100 is initialized, the information stored in the first node, or may read, when detecting that the first node needs to send first data, the information stored in the first node. The stored information may be configured by the root complex, or may be configured by another node, or may be manually configured, or the like. This is not limited in this embodiment of this application.

The first data is data sent by the first node to a second node, that is, the first node is a source node of the first data. The first node may be an endpoint or a function of an endpoint in the PCIe system 100, or may be a switching node or a function of a switching node in the PCIe system 100. For example, the first node may be an endpoint 1, or may be a bridge node 4. The information stored in the first node may be information about configuration space of the first node. Configuration space of a node may be a segment of physical storage address used to store configuration information.

The root complex reads the information stored in the first node, and may determine, based on the information, a working mode supported by the first node. For example, reserved space in the configuration space of the first node may store indication information, and the indication information indicates the working mode supported by the first node. The root complex may read the reserved space in the configuration space of the first node, to determine, based on the indication information that is read, the working mode supported by the first node. The reserved space is an unused storage address in the configuration space. Working modes supported by the first node include a first working mode and a second working mode, the first working mode is a working mode in which communication between nodes does not use the root complex, and the second working mode is a working mode in which communication between nodes needs to use the root complex.

Further, the root complex may determine, based on the information stored in the first node, the working mode supported by the first node. If the root complex determines that the first node supports only the first working mode, only step S1002 is performed. If the root complex determines that the first node supports only the second working mode, steps S1003 and S1004 are performed. If the root complex determines that the first node supports the first working mode and the second working mode, steps S1002 to S1004 are performed.

S1002: The root complex writes identity information of the second node into the first node when determining that the first node supports the first working mode.

After the root complex determines that the first node supports the first working mode, the root complex writes identity information of a destination node (for example, referred to as the second node) corresponding to the first node into the first node. Specifically, the root complex may first determine the destination node corresponding to the first node, and then the root complex may write the identity information of the destination node corresponding to the first node into the first node. For example, the root complex may determine the destination node of the first data based on a type (for example, a video type or an image type) of the first data and a function of each node in the PCIe system 100. For example, the first node is an endpoint 1, the type of the first data is the video type, an endpoint 2 is a display, and an endpoint 3 is a memory. The root complex may determine that the destination node of the first data is the endpoint 2. The root complex writes the identity information of the second node into the first node, for example, writes the identity information of the second node into the information stored in the first node, or writes the identity information of the second node into a variable in the first node, or writes the identity information of the second node into a parameter in the first node. For example, the root complex writes the identity information of the second node into the reserved space in the configuration space of the first node.

The second node is the destination node of the first data. The second node may be an endpoint or a function of an endpoint in the PCIe system 100, or may be a switching node or a function of a switching node in the PCIe system 100. Identity information of each node in the PCIe system 100 is unique. Identity information of a node is allocated by the root complex. For example, identity information of a node may be a BDF of the node allocated by the root complex, or an ID of the node allocated by the root complex. For a specific allocation process, refer to the process shown in FIG. 3. Details are not described herein again.

In specific implementation, if the root complex determines that there are a plurality of destination nodes corresponding to the first node, the root complex may write identity information of each of the plurality of destination nodes into the first node. For example, the first node is an endpoint 1, the type of the first data is the video type, and both an endpoint 2 and an endpoint 3 are displays. The root complex determines that both the endpoint 2 and the endpoint 3 can display the first data. Therefore, the root complex determines that both the endpoint 2 and the endpoint 3 are destination nodes of the endpoint 1. In this case, the root complex may write both identity information of the endpoint 2 and identity information of the endpoint 3 into the endpoint 1.

In a possible implementation, the root complex may write identity information of the first node into the first node. In this way, when sending the first data, the first node may encapsulate the first data, the identity information of the first node, and the identity information of the second node together into a TLP. In this way, the TLP may carry a source address, so that the destination node can determine, based on the source address, that a sending node of the TLP is the first node. The first node may further determine, based on whether a destination address carried in a received TLP is consistent with the identity information of the first node, whether to discard the received TLP. For example, if the destination address carried in the TLP is consistent with the identity information of the first node, the first node determines that the TLP is sent to the first node. If the destination address carried in the TLP is inconsistent with the identity information of the first node, the first node determines that the TLP is not sent to the first node, and may discard the TLP.

The root complex writes the identity information of the first node into the first node, for example, writes the identity information of the first node into the information stored in the first node, or writes the identity information of the first node into a variable in the first node, or writes the identity information of the first node into a parameter in the first node. For example, the root complex writes the identity information of the first node into the reserved space in the configuration space of the first node.

S1003: The root complex allocates a first memory address to the first node when determining that the first node supports the second working mode.

The root complex maps local memory space of the first node to running memory corresponding to a CPU, to obtain the first memory address. The first memory address is a physical address in the running memory corresponding to the CPU to which the local memory space of the first node is mapped. For example, a size of the local memory space of the first node is 2 MB, an address of the local memory space is 0x0000 to 0x007F, a size of the running memory corresponding to the CPU is 2 GB (GigaByte), and an address of the running memory is 0x0000 to 0xFFFF. The address of the running memory corresponding to the CPU to which the local memory space of the first node is mapped is 0x0100 to 0x017F, that is, the first memory address is 0x0100 to 0x017F.

S1004: The root complex writes the first memory address into the first node.

The root complex writes the first memory address into the first node, for example, writes the first memory address into a register of the first node, or writes the first memory address into the information stored in the first node, or writes the first memory address into a variable in the first node, or writes the first memory address into a parameter in the first node.

It should be noted that the process shown in FIG. 10 may be implemented by the root complex, or may be implemented by a chip in the root complex, or may be implemented by another device, for example, implemented by a CPU. This is not limited in this embodiment of this application.

In this embodiment of this application, the root complex writes the identity information of the destination node (for example, the second node) into the sending node (for example, the first node). When sending the first data to the destination node, the sending node may encapsulate the first data together with the identity information of the destination node into a TLP, and send the TLP to an intermediate node (for example, a third node). The intermediate node may determine a destination address of the TLP by decapsulating the received TLP, to perform forwarding based on the destination address of the TLP without using the root complex. In this way, communication between endpoints, between switching nodes, and between an endpoint and a switching node in the PCIe system can be directly implemented without using the root complex. This can reduce complexity of communication between the nodes in the PCIe system.

Further, the root complex writes the identity information of the destination node into the first node, and allocates the first memory address to the first node, so that the first node supports both the first working mode and the second working mode. This achieves compatibility between the two working modes. When two nodes communicate with each other, a data transmission link that passes through the root complex may be selected, or a data transmission link that does not pass through the root complex may be selected. This implements redundancy backup of the data transmission link in the PCIe system, and improves stability of data transmission in the PCIe system. For example, if the root complex is faulty, a node may select a data transmission link that does not pass through the root complex to directly communicate with another node.

Figure 11:
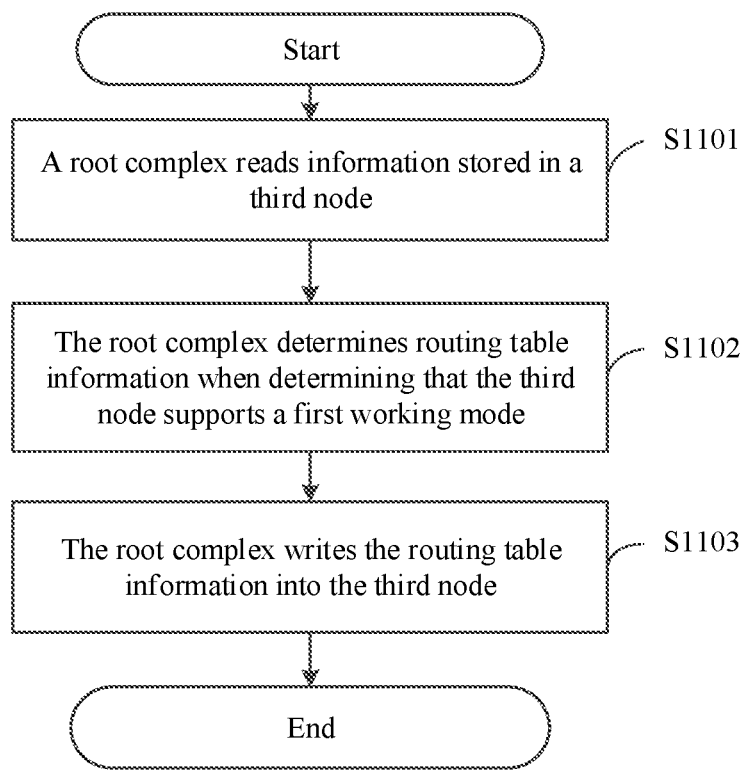
FIG. 11 is a schematic flowchart of another PCIe-based communications method according to an embodiment of this application.

According to the process shown in FIG. 10, the root complex may write identity information of a destination node corresponding to a node in the PCIe system into the node, so that an intermediate node can determine a destination address of a received TLP. To implement direct communication between nodes, an embodiment of this application provides another PCIe-based communications method. According to the method, an intermediate node may forward a received TLP based on a destination address of the TLP without using a root complex, to implement direct communication between nodes. FIG. 11 is a flowchart of a PCIe-based communications method according to an embodiment of this application. The method may be applied to a PCIe system in an intra-vehicle network, especially an intra-vehicle network of an autonomous vehicle, and certainly may also be applied to a PCIe system of another device. For example, the method may be applied to the PCIe system 100 shown in FIG. 1 or FIG. 2. The following describes the method by using an example in which the method is applied to a root complex in the PCIe system 100.

S1101: The root complex reads information stored in a third node.

In specific implementation, the root complex may read, when the PCIe system 100 is initialized, the information stored in the third node, or may read, when detecting that the third node needs to forward first data, the information stored in the third node. This is not limited in this embodiment of this application.

The third node is a node through which the first data arrives at a destination node. The third node may be a switching node or a function of a switching node in the PCIe system 100. For example, the third node may be a bridge node 4, or may be a switching node 1. The information stored in the third node may be information about configuration space of the third node.

The root complex reads the information stored in the third node, and may determine, based on the stored information, a working mode supported by the third node. For example, reserved space in the configuration space of the third node may store indication information, and the indication information indicates the working mode supported by the third node. The root complex may read the reserved space in the configuration space of the third node, to determine, based on the indication information that is read, the working mode supported by the third node. The reserved space is an unused storage address in the configuration space. Working modes supported by the third node include a first working mode and a second working mode, the first working mode is a working mode in which communication between nodes does not use the root complex, and the second working mode is a working mode in which communication between nodes needs to use the root complex.

That the third node supports the first working mode includes that the third node supports only the first working mode, or that the third node supports the first working mode and the second working mode.

When the third node supports the first working mode and the second working mode, the root complex may allocate a second memory address to the third node, and write the second memory address into the third node. The second memory address is a physical address in running memory corresponding to a CPU to which local memory space of the first node is mapped. For example, the root complex maps the local memory space of the third node to the running memory corresponding to the CPU, to obtain the second memory address. The root complex writes the second memory address into the third node, for example, writes the second memory address into a register of the third node, or writes the second memory address into the information stored in the third node, or writes the second memory address into a variable in the third node, or writes the second memory address into a parameter in the third node.

In a possible implementation, when determining that the third node supports the first working mode, the root complex writes identity information of the destination node corresponding to the third node into the third node. For example, the root complex may determine, based on a function of each node in the PCIe system 100, the destination node corresponding to the third node, and then the root complex writes the identity information of the destination node corresponding to the third node into the third node. If the root complex determines that there are a plurality of destination nodes corresponding to the third node, the root complex may write identity information of each of the plurality of destination nodes into the third node. The root complex writes the identity information of the destination node corresponding to the third node into the third node, for example, writes the identity information of the destination node corresponding to the third node into the information stored in the third node, or writes the identity information of the destination node corresponding to the third node into a variable in the third node, or writes the identity information of the destination node corresponding to the third node into a parameter in the third node. For example, the root complex writes the identity information of the destination node corresponding to the third node into the reserved space in the configuration space of the third node.

In another possible implementation, when determining that the third node supports the first working mode, the root complex writes identity information of the third node into the third node. In this way, the third node may use a sent or forwarded TLP to carry the identity information of the third node, so that the destination node determines, based on a source address, that a sending node of the TLP is the third node. The third node may further determine, based on whether a destination address carried in a received TLP is consistent with the identity information of the third node, whether to discard the received TLP. For example, if the destination address carried in the received TLP is consistent with the identity information of the third node, the third node determines that the received TLP is sent to the third node. If the destination address carried in the received TLP is inconsistent with the identity information of the third node, the third node determines that the received TLP is not sent to the third node, and discards the received TLP. The root complex writes the identity information of the third node into the third node, for example, writes the identity information of the third node into the information stored in the third node, or writes the identity information of the third node into a variable in the third node, or writes the identity information of the third node into a parameter in the third node. For example, the root complex writes the identity information of the third node into the reserved space in the configuration space of the third node.

Further, the root complex determines, based on the information stored in the third node, the working mode supported by the third node. If the root complex determines that the third node supports the first working mode, steps S1102 and S1103 are performed; or if the root complex determines that the third node does not support the first working mode, the process ends.

S1102: The root complex determines routing table information when determining that the third node supports the first working mode.

The root complex may determine routing table information of the third node based on information such as identity information or a function of each node in the PCIe system 100. The routing table information includes identity information of a second node and identity information of a next-hop node to the second node.

If the identity information allocated by the root complex to each node is a BDF, the routing table information of the third node may be a bus number of the third node. After receiving a TLP, the third node determines a next-hop node of the TLP based on the bus number of the third node and a bus number of the destination node. For example, if the bus number of the destination node is greater than a maximum bus number in a branch in which the third node is located, the third node discards the TLP. For another example, if the bus number of the destination node is greater than or equal to a downstream bus number of the third node and is less than or equal to a maximum bus number in a branch in which the third node is located, the third node determines that the next-hop node of the TLP is a node mounted to a downstream bus of the third node.

If the root complex sequentially allocates identity information to each node and the allocated identity information is an ID number, the routing table information of the third node may be an ID number range, and the ID number range covers ID numbers of all nodes mounted to the third node. For example, the root complex sequentially allocates the identity information to each node according to a depth-first principle. After receiving a TLP, the third node may determine a next-hop node of the TLP based on whether an ID number of the destination node is within the ID number range. For example, if the ID number of the destination node is not within the ID number range, the third node discards the TLP; or if the ID number of the destination node is within the ID number range, the third node determines that the next-hop node of the TLP is a node mounted to the third node.

If the root complex randomly allocates identity information to each node and the allocated identity information is an ID number, the routing table information of the third node may include an ID number of at least one node mounted to the third node, an ID number of at least one destination node corresponding to each node in the at least one node, and an ID number of a next-hop node to the at least one destination node. For example, an intermediate node is a bridge node 4, a node mounted to the bridge node 4 is an endpoint 1, destination nodes corresponding to the endpoint 1 include an endpoint 2 and an endpoint 3, a next-hop node of data from the bridge node 4 to the endpoint 2 is a bridge node 5, and a next-hop node of data from the bridge node 4 to the endpoint 3 is a bridge node 3. Routing table information of the bridge node 4 includes an ID number of the endpoint 1, an ID number of the endpoint 2, an ID number of the bridge node 5, an ID number of the endpoint 3, and an ID number of the bridge node 3.

S1103: The root complex writes the routing table information into the third node.

The root complex writes the routing table information into the third node, for example, writes the routing table information into the information stored in the third node, or writes the routing table information into a variable in the third node, or writes the routing table information into a parameter in the third node. For example, the root complex writes the routing table information into the reserved space in the configuration space of the third node.

It should be noted that the process shown in FIG. 11 may be implemented by the root complex, or may be implemented by a chip in the root complex, or may be implemented by another device, for example, implemented by the third node. This is not limited in this embodiment of this application.

For example, after the root complex allocates the identity information to the node in the PCIe system 100, the third node determines that the third node supports the first working mode; the third node sends a broadcast signal to another node in the PCIe system 100, to obtain information such as identity information or a function of the another node; and then the third node establishes routing table information based on the information such as the identity information or the function of the another node.

In the foregoing embodiment of this application, the root complex writes the routing table information into the intermediate node (for example, the third node). In this way, the intermediate node may forward a received TLP based on a destination address in the received TLP and the routing table information without using the root complex. In this way, communication between endpoints, between switching nodes, and between an endpoint and a switching node in the PCIe system can be directly implemented without using the root complex. This can reduce complexity of communication between the nodes in the PCIe system.

It should be noted that, the root complex may traverse all nodes in the PCIe system 100 according to a depth-first principle, and allocate identity information to all the nodes according to the process shown in FIG. 3. For each node in at least one node that is in the PCIe system 100 and that supports the first working mode or supports the first working mode and the second working mode, identity information of the node and identity information of at least one destination node corresponding to the node are written into the node. Then, routing table information of a bridge node is determined based on the identity information of all the nodes in the PCIe system 100, and the routing table information is written into the bridge node.

Figure 12:
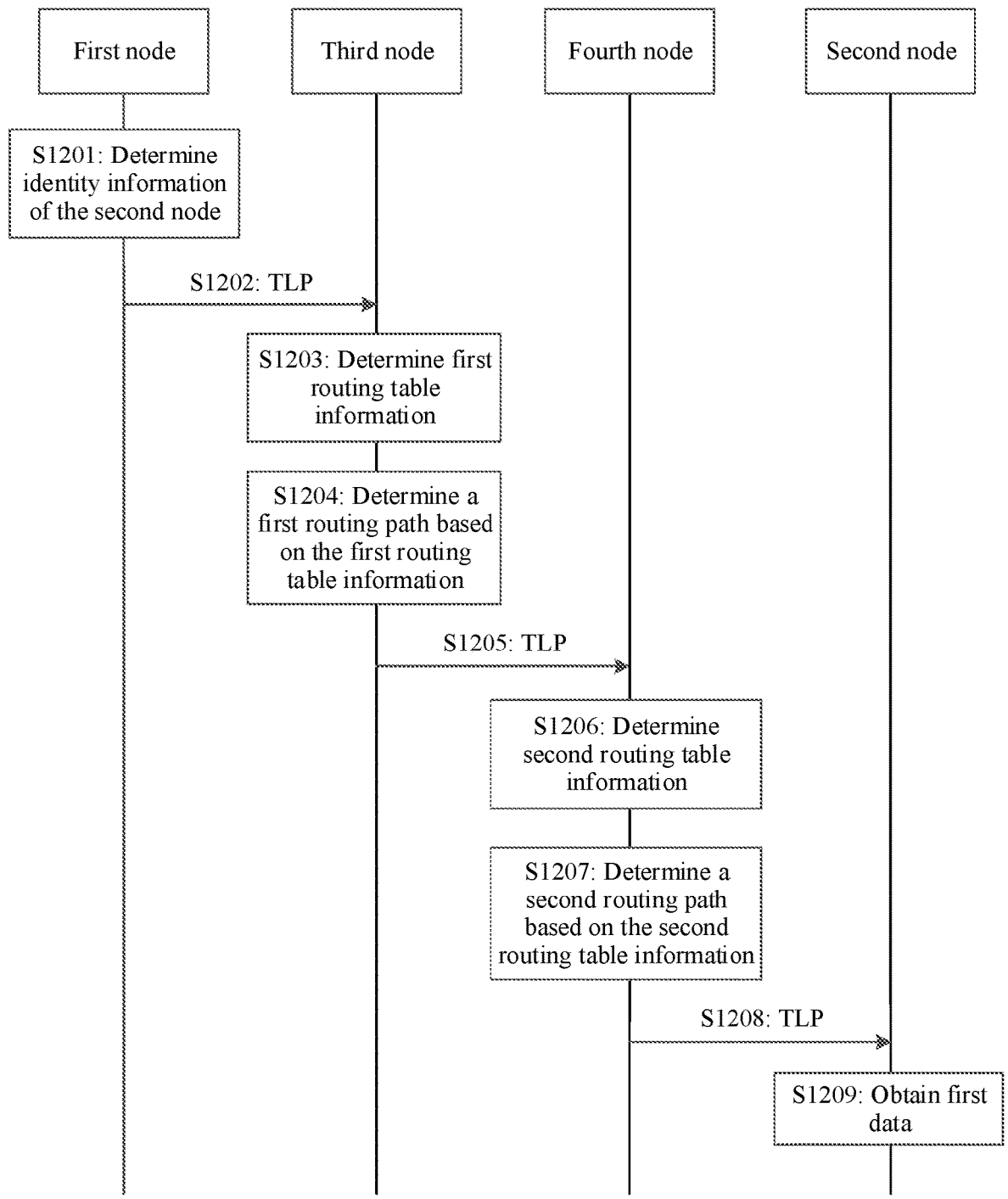
FIG. 12 is a schematic flowchart of another PCIe-based communications method according to an embodiment of this application.

Through the processes shown in FIG. 10 and FIG. 11, the root complex writes the identity information of the destination node into the sending node, and writes the routing table information into the intermediate node. Based on the identity information of the destination node and the routing table information, communication between nodes can be implemented without using the root complex. During data transmission, an embodiment of this application provides another PCIe-based communications method. This method can implement direct communication between nodes. FIG. 12 is a flowchart of a PCIe-based communications method according to an embodiment of this application. The method may be applied to a PCIe system in an intra-vehicle network, especially an intra-vehicle network of an autonomous vehicle, and certainly may also be applied to a PCIe system of another device. For example, the method may be applied to the PCIe system 100 shown in FIG. 1 or FIG. 2. The following describes the method by using an example in which a first node is an endpoint 1, a second node is an endpoint 2, a third node is a bridge node 4, and a fourth node is a bridge node 5.

S1201: The first node determines identity information of the second node.

When determining to send first data to the second node, the first node may determine the identity information of the second node based on information stored in the first node. The stored information is configuration information, a variable, a parameter, or the like. For example, the first node may determine the identity information of the second node based on reserved space in configuration space of the first node. The second node is a destination node of the first data, and the first node supports a first working mode, or the first node supports the first working mode and a second working mode. The first working mode is a working mode in which communication between nodes does not use a root complex, and the second working mode is a working mode in which communication between nodes needs to use the root complex.

When the first node supports the second working mode, the first node stores a memory address allocated by the root complex. For example, a register of the first node stores the memory address.

S1202: The first node sends a TLP to the third node, and the third node receives the TLP.

The TLP may include the first data and the identity information of the second node.

Figure 17:
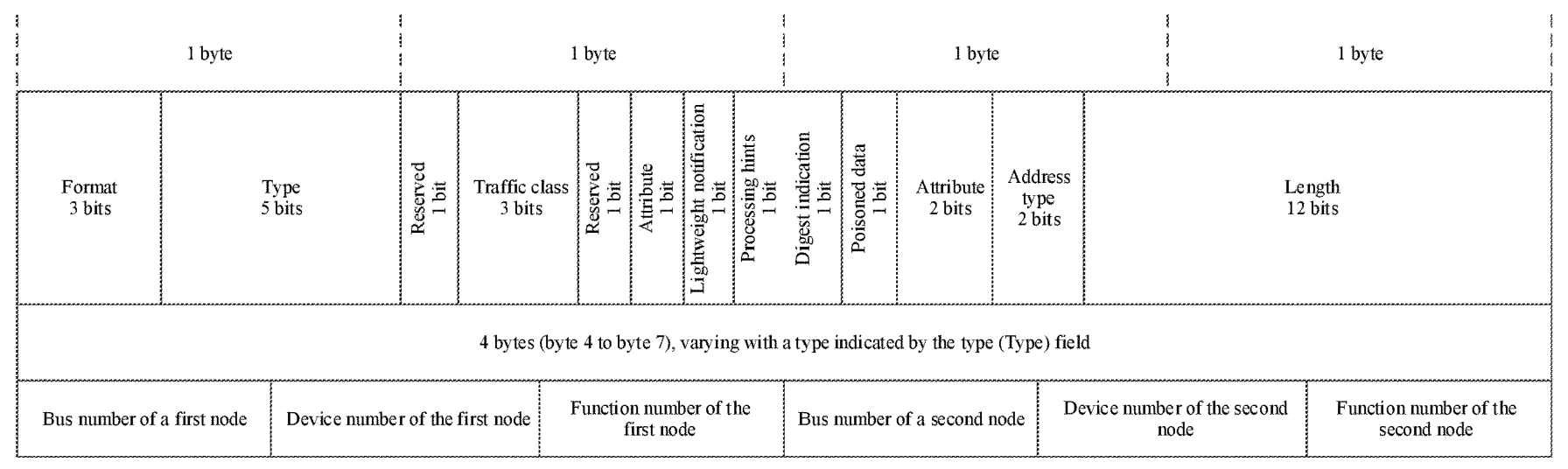
Figure 18:
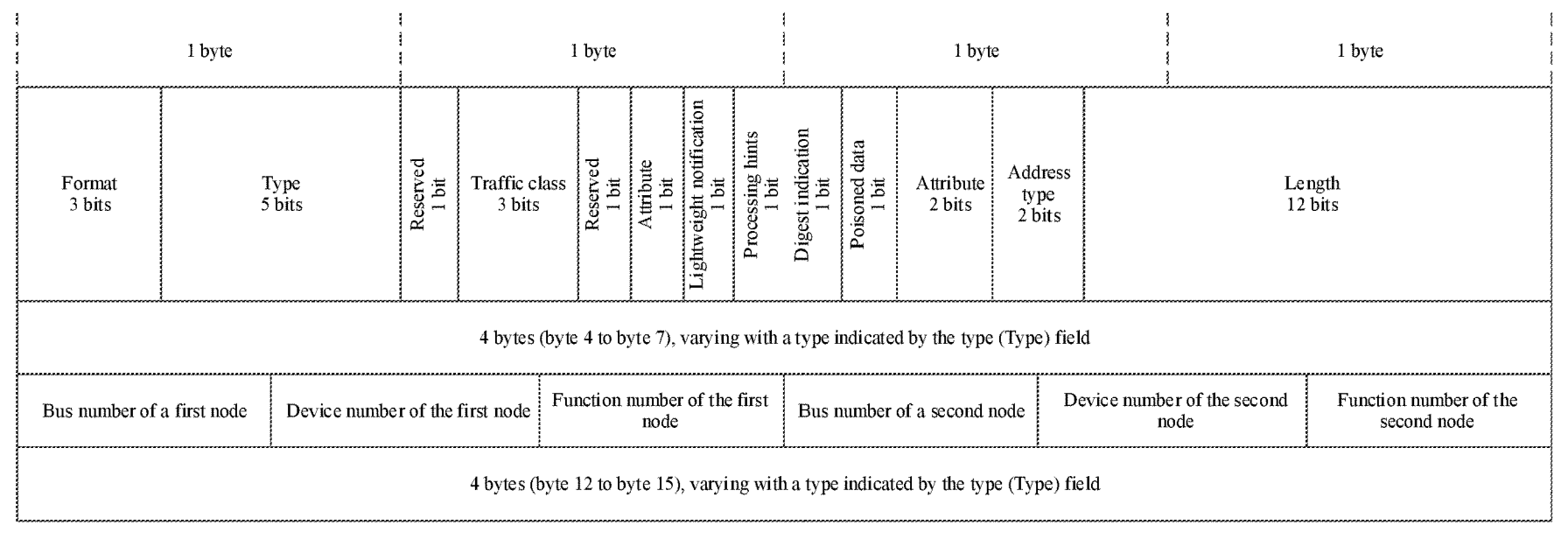

In a possible implementation, the TLP may include the first data, identity information of the first node, and the identity information of the second node. For example, the first node may determine the identity information of the first node based on the information stored in the first node, and then encapsulate the identity information of the first node, the first data, and the identity information of the second node into the TLP. For example, the identity information is a BDF. If a length of a TLP header of the TLP is 12 bytes, a byte 8 to a byte 11 in the TLP header may be used to indicate a BDF of the first node and a BDF of the second node, as shown in FIG. 17. If a length of a TLP header of the TLP is 16 bytes, a byte 8 to a byte 11 in the TLP header may be used to indicate a BDF of the first node and a BDF of the second node, as shown in FIG. 18.

S1203: The third node determines first routing table information.

After receiving the TLP, the third node may determine the first routing table information based on information stored in the third node. The stored information is configuration information, a variable, a parameter, or the like. For example, the third node may determine the first routing table information based on reserved space in configuration space of the third node. For example, the first routing table information may include the identity information of the second node and identity information of the fourth node. The third node supports the first working mode, or the third node supports the first working mode and the second working mode.

When the third node supports the second working mode, the third node stores a memory address allocated by the root complex. For example, a register of the third node stores the memory address.

S1204: The third node determines a first routing path based on the first routing table information.

The third node may determine the first routing path based on the first routing table information and the identity information of the second node, and the first routing path is used to indicate that a next-hop node of the TLP is the fourth node.

S1205: The third node sends the TLP to the fourth node, and the fourth node receives the TLP.

In a possible implementation, the TLP may include the first data, the identity information of the first node, and the identity information of the second node.

In another possible implementation, the TLP may include the first data, identity information of the third node, and the identity information of the second node. For example, the third node may determine the identity information of the third node based on the information stored in the third node, and then encapsulate the identity information of the third node into the TLP.

S1206: The fourth node determines second routing table information.

After receiving the TLP, the fourth node may determine the first routing table information based on information stored in the fourth node. The stored information is configuration information, a variable, a parameter, or the like. For example, the fourth node may determine the second routing table information based on reserved space in configuration space of the fourth node. For example, the second routing table information may include the identity information of the second node. The fourth node supports the first working mode, or the fourth node supports the first working mode and the second working mode.

When the fourth node supports the second working mode, the fourth node stores a memory address allocated by the root complex. For example, a register of the fourth node stores the memory address.

S1207: The fourth node determines a second routing path based on the second routing table information.

The fourth node may determine the second routing path based on the second routing table information and the identity information of the second node, and the second routing path is used to indicate that a next-hop node of the TLP is the second node.

S1208: The fourth node sends the TLP to the second node, and the second node receives the TLP.

In a possible implementation, the TLP may include the first data, the identity information of the first node, and the identity information of the second node.

In another possible implementation, the TLP may include the first data, the identity information of the third node, and the identity information of the second node.

In another possible implementation, the TLP may include the first data, the identity information of the fourth node, and the identity information of the second node. For example, the fourth node may determine the identity information of the fourth node based on information stored in the fourth node, and then encapsulate the identity information of the fourth node into the TLP.

S1209: The second node obtains the first data.

After receiving the TLP, the second node decapsulates the TLP to obtain the first data sent by the first node.

In the foregoing embodiment of this application, a sending node (for example, the first node) determines identity information of a receiving node (for example, the second node) based on stored information, and then encapsulates and sends the first data and the identity information of the receiving node to an intermediate node (for example, the third node), so that the intermediate node forwards the first data to the receiving node. In this way, communication between endpoints, between switching nodes, and between an endpoint and a switching node in the PCIe system can be directly implemented without using the root complex. This can reduce complexity of communication between the nodes in the PCIe system.

Figure 13:
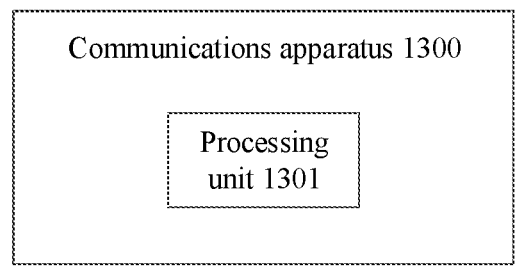
FIG. 13 is a schematic diagram of a structure of a PCIe-based communications apparatus according to an embodiment of this application.

Based on a same technical idea, an embodiment of this application provides a PCIe-based communications apparatus. A diagram of a structure of the apparatus may be shown in FIG. 13, and the apparatus includes a processing unit 1301.

The communications apparatus 1300 may be specifically configured to implement the method performed by the root complex in the embodiments in FIG. 10 and FIG. 11. The apparatus 1300 may be the root complex, or may be a chip, a chipset, or a part of a chip that performs related method functions in the root complex. The processing unit 1301 is configured to write identity information of a second node into a first node, and write routing table information into a third node, where the first node is a source node of first data, the second node is a destination node of the first data, and the third node is a node through which the first data arrives at the second node.

In a possible implementation, the processing unit 1301 is further configured to determine that the first node supports a first working mode; or determine that the first node supports the first working mode and a second working mode, where the first working mode is a working mode in which communication between nodes does not use the root complex, and the second working mode is a working mode in which communication between nodes needs to use the root complex.

In a possible implementation, the processing unit 1301 is further configured to configure a first memory address for the first node when the first node is in the second working mode, where the first memory address is a physical address in running memory corresponding to a CPU to which local memory space of the first node is mapped.

In a possible implementation, the processing unit 1301 is further configured to determine that the third node supports the first working mode; or determine that the third node supports the first working mode and the second working mode, where the first working mode is a working mode in which communication between nodes does not use the root complex, and the second working mode is a working mode in which communication between nodes needs to use the root complex.

In a possible implementation, the processing unit 1301 is further configured to configure a second memory address for the third node when the third node is in the second working mode, where the second memory address is a physical address in the running memory corresponding to the CPU to which local memory space of the third node is mapped.

In a possible implementation, the processing unit 1301 is further configured to write identity information of the first node into the first node.

In a possible implementation, the processing unit 1301 is further configured to write identity information of the third node into the third node.

In a possible implementation, the identity information is a BDF or an ID number.

Division into modules in embodiments of this application is an example, and is merely logical function division. During actual implementation, there may be another division manner. In addition, functional modules in embodiments of this application may be integrated into one processor, or each of the modules may exist alone physically, or two or more modules may be integrated into one module. The integrated module may be implemented in a form of hardware, or may be implemented in a form of a software functional module. It may be understood that, for functions or implementations of the modules in embodiments of this application, further refer to related descriptions in the method embodiments.

Figure 14:
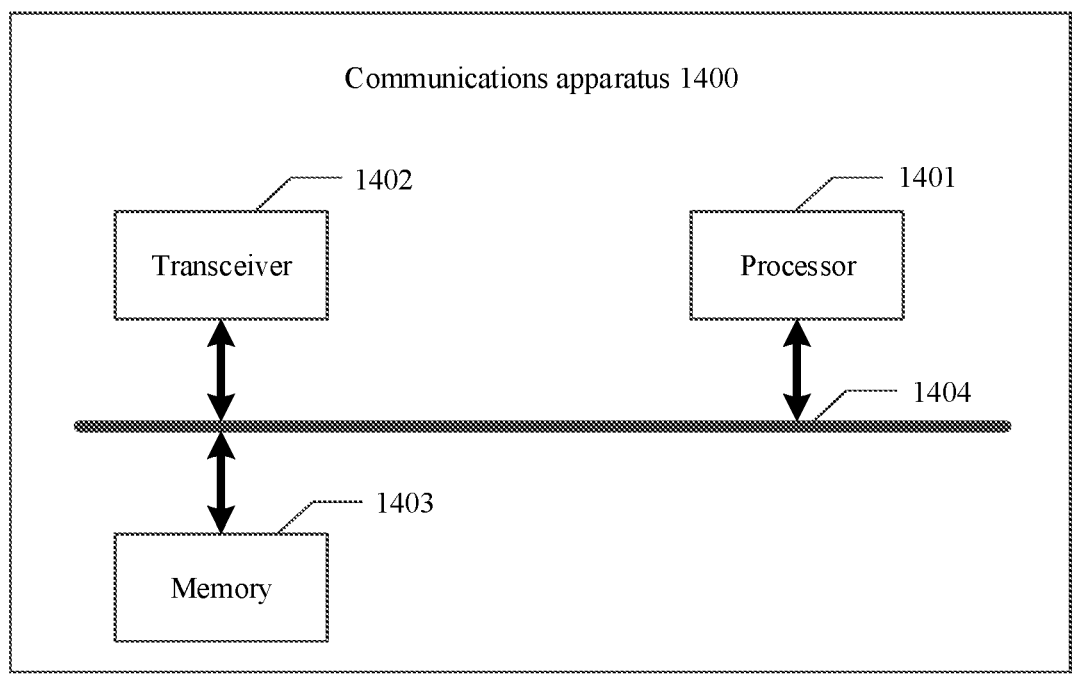
FIG. 14 is a schematic diagram of a structure of another PCIe-based communications apparatus according to an embodiment of this application.

In a possible implementation, a communications apparatus 1400 may be shown in FIG. 14, and the apparatus 1400 may be an endpoint or a chip in an endpoint. The apparatus 1400 may include a processor 1401. The processing unit 1301 may be the processor 1401. Optionally, the apparatus 1400 may further include a transceiver 1402 and a memory 1403.

The processor 1401 may be a CPU, a digital processing unit, or the like. The transceiver 1402 may be a communications interface, an interface circuit such as a transceiver circuit, a transceiver chip, or the like. The apparatus 1400 further includes the memory 1403, configured to store a program executed by the processor 1401. The memory 1403 may be a nonvolatile memory, for example, a hard disk drive (hard disk drive, HDD) or a solid-state drive (solid-state drive, SSD), or may be a volatile memory (volatile memory), for example, a random access memory (random access memory, RAM). The memory 1403 is any other medium that can carry or store expected program code in a form of instructions or a data structure and can be accessed by a computer, but is not limited thereto.

The processor 1401 is configured to execute the program code stored in the memory 1403, and is specifically configured to perform an action of the processing unit 1301. Details are not described in this application again.

A specific connection medium between the transceiver 1402, the processor 1401, and the memory 1403 is not limited in this embodiment of this application. In this embodiment of this application, in FIG. 14, the memory 1403, the processor 1401, and the transceiver 1402 are connected by using a bus 1404. The bus is represented by using a bold line in FIG. 14. A connection manner between other parts is merely an example for description, and does not constitute a limitation. The bus 1404 may be classified into an address bus, a data bus, a control bus, and the like. For ease of representation, the bus is represented by using only one bold line in FIG. 14. However, this does not indicate that there is only one bus or only one type of bus.

Figure 15:
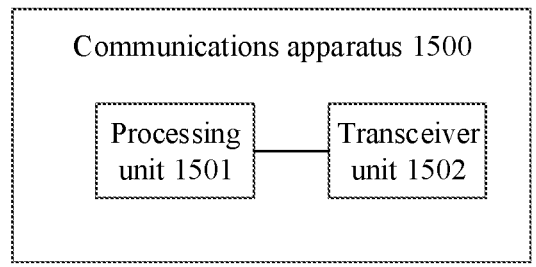
FIG. 15 is a schematic diagram of a structure of another PCIe-based communications apparatus according to an embodiment of this application.

Based on a same technical idea as the method embodiments, an embodiment of this application provides a PCIe-based communications apparatus 1500. A structure of the apparatus 1500 may be shown in FIG. 15, and the apparatus 1500 includes a processing unit 1501 and a transceiver unit 1502.

The communications apparatus 1500 may implement the method performed by the first node in the embodiment in FIG. 12. The apparatus 1500 may be the first node, or may be a chip, a chipset, or a part of a chip that performs related method functions in the first node. The processing unit 1501 is configured to determine identity information of a second node based on information stored in the first node, where the second node is a destination node of first data. The transceiver unit 1502 is configured to send a first TLP to a third node, where the first TLP includes the first data and the identity information of the second node.

In a possible implementation, the first node supports a first working mode, and the first working mode is a working mode in which communication between nodes does not use a root complex.

In a possible implementation, the first node supports a first working mode and a second working mode, the first working mode is a working mode in which communication between nodes does not use a root complex, and the second working mode is a working mode in which communication between nodes needs to use the root complex.

In a possible implementation, the stored information further includes identity information of the first node.

In a possible implementation, the first TLP further includes the identity information of the first node.

In a possible implementation, the identity information is a BDF or an ID number.

Division into modules in embodiments of this application is an example, and is merely logical function division. During actual implementation, there may be another division manner. In addition, functional modules in embodiments of this application may be integrated into one processor, or each of the modules may exist alone physically, or two or more modules may be integrated into one module.

The integrated module may be implemented in a form of hardware, or may be implemented in a form of a software functional module. It may be understood that, for functions or implementations of the modules in embodiments of this application, further refer to related descriptions in the method embodiments.

Figure 16:
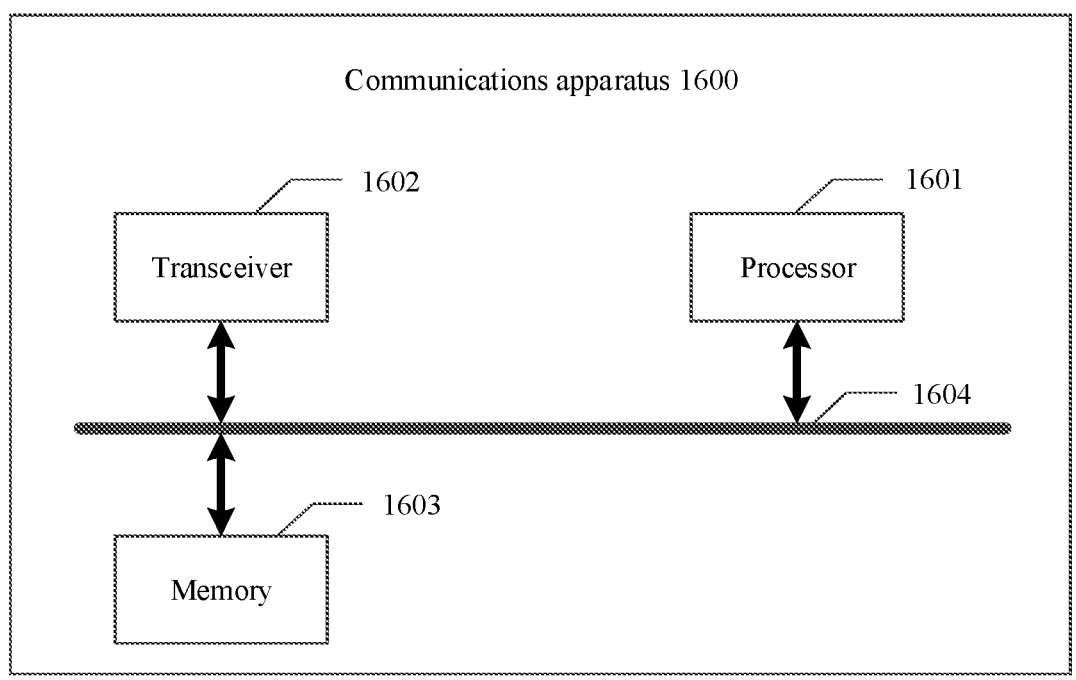
FIG. 16 is a schematic diagram of a structure of another PCIe-based communications apparatus according to an embodiment of this application.

In a possible implementation, a communications apparatus 1600 may be shown in FIG. 16, and the apparatus 1600 may be an endpoint or a chip in an endpoint, or may be a switching node or a chip in a switching node. The apparatus 1600 may include a processor 1601, and may further include a transceiver 1602 and a memory 1603. The processing unit 1501 may be the processor 1601. The transceiver unit 1502 may be the transceiver 1602.

The processor 1601 may be a CPU, a digital processing unit, or the like. The transceiver 1602 may be a communications interface, an interface circuit such as a transceiver circuit, a transceiver chip, or the like. The apparatus 1600 further includes the memory 1603, configured to store a program executed by the processor 1601. The memory 1603 may be a nonvolatile memory, for example, a hard disk drive (hard disk drive, HDD) or a solid-state drive (solid-state drive, SSD), or may be a volatile memory (volatile memory), for example, a random access memory (random access memory, RAM). The memory 1603 is any other medium that can carry or store expected program code in a form of instructions or a data structure and can be accessed by a computer, but is not limited thereto.

The processor 1601 is configured to execute the program code stored in the memory 1603, and is specifically configured to perform an action of the processing unit 1501. Details are not described in this application. The transceiver 1602 is specifically configured to perform an action of the transceiver unit 1502. Details are not described in this application.

A specific connection medium between the transceiver 1602, the processor 1601, and the memory 1603 is not limited in this embodiment of this application. In this embodiment of this application, in FIG. 16, the memory 1603, the processor 1601, and the transceiver 1602 are connected by using a bus 1604. The bus is represented by using a bold line in FIG. 16. A connection manner between other parts is merely an example for description, and does not constitute a limitation. The bus 1604 may be classified into an address bus, a data bus, a control bus, and the like. For ease of representation, only one bold line is used to represent the bus in FIG. 16, but this does not mean that there is only one bus or only one type of bus.

An embodiment of this application further provides a computer-readable storage medium, configured to store computer software instructions that need to be executed by the foregoing processor, and the computer software instructions include a program that needs to be executed by the foregoing processor.

A person skilled in the art should understand that embodiments of this application may be provided as a method, a system, or a computer program product. Therefore, this application may use a form of a hardware-only embodiment, a software-only embodiment, or an embodiment with a combination of software and hardware. In addition, this application may use a form of a computer program product implemented on one or more computer-usable storage media (including but not limited to a disk memory, a CD-ROM, an optical memory, and the like) that include computer-usable program code.

This application is described with reference to the flowcharts and/or block diagrams of the methods, the devices (systems), and the computer program product according to this application. It should be understood that computer program instructions may be used to implement each process and/or each block in the flowcharts and/or the block diagrams and a combination of a process and/or a block in the flowcharts and/or the block diagrams. The computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more procedures in the flowcharts and/or in one or more blocks in the block diagrams.

The computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

The computer program instructions may alternatively be loaded onto a computer or another programmable data processing device, so that a series of operations and steps are performed on the computer or the another programmable device, to generate computer-implemented processing. Therefore, the instructions executed on the computer or the another programmable device provide steps for implementing a specific function in one or more procedures in the flowcharts and/or in one or more blocks in the block diagrams.

It is clear that, a person skilled in the art can make various modifications and variations to this application without departing from the protection scope of this application. This application is intended to cover these modifications and variations of this application provided that they fall within the scope of protection defined by the claims of this application and their equivalent technologies.

What is claimed is:

1. A peripheral component interconnect express (PCIe)-based communications method, wherein the method comprises:
   writing identity information of a second node into a first node, wherein the first node is a source node of first data, and the second node is a destination node of the first data;
   writing routing table information into a third node, wherein the third node is a node through which the first data arrives at the second node; and
   determining whether the first node supports a first working mode or whether the third node supports the first working mode, wherein the first working mode is a working mode in which communication between nodes does not use a root complex.

2. The method according to claim 1, wherein the method further comprises:
   determining that the first node supports the first working mode; or
   determining that the first node supports the first working mode and a second working mode, wherein
   the second working mode is a working mode in which communication between nodes uses the root complex.

3. The method according to claim 2, wherein the method further comprises:

configuring a first memory address for the first node when the first node is in the second working mode, wherein the first memory address is a physical address in running memory corresponding to a central processing unit (CPU) to which local memory space of the first node is mapped.

4. The method according to claim 1, wherein the method further comprises:
determining that the third node supports the first working mode; or
determining that the third node supports the first working mode and a second working mode, wherein
the second working mode is a working mode in which communication between nodes uses the root complex.

5. The method according to claim 4, wherein the method further comprises:
configuring a second memory address for the third node when the third node is in the second working mode, wherein the second memory address is a physical address in running memory corresponding to a central processing unit (CPU) to which local memory space of the third node is mapped.

6. The method according to claim 1, wherein the method further comprises:
writing identity information of the first node into the first node.

7. The method according to claim 1, wherein the method further comprises:
writing identity information of the third node into the third node.

8. A peripheral component interconnect express (PCIe)-based communications apparatus, wherein the apparatus comprises:
a processor, configured to:
write identity information of a second node into a first node, wherein the first node is a source node of first data, and the second node is a destination node of the first data;
write routing table information into a third node, wherein the third node is a node through which the first data arrives at the second node; and
determine whether the first node supports a first working mode or whether the third node supports the first working mode, wherein the first working mode is a working mode in which communication between nodes does not use a root complex.

9. The apparatus according to claim 8, wherein the processor is further configured to:
determine that the first node supports the first working mode; or
determine that the first node supports the first working mode and a second working mode, wherein
the second working mode is a working mode in which communication between nodes uses the root complex.

10. The apparatus according to claim 9, wherein the processor is further configured to:
configure a first memory address for the first node when the first node is in the second working mode, wherein the first memory address is a physical address in running memory corresponding to a central processing unit (CPU) to which local memory space of the first node is mapped.

11. The apparatus according to claim 8, wherein the processor is further configured to:
determine that the third node supports the first working mode; or
determine that the third node supports the first working mode and a second working mode, wherein
the second working mode is a working mode in which communication between nodes uses the root complex.

12. The apparatus according to claim 11, wherein the processor is further configured to:
configure a second memory address for the third node when the third node is in the second working mode, wherein the second memory address is a physical address in running memory corresponding to a central processing unit (CPU) to which local memory space of the third node is mapped.

13. The apparatus according to claim 8, wherein the processor is further configured to:
write identity information of the first node into the first node.

14. The apparatus according to claim 8, wherein the processor is further configured to:
write identity information of the third node into the third node.

15. The apparatus according to claim 8, wherein the identity information is a bus, device, and function number (BDF) or an identity (ID) number.

16. A peripheral component interconnect express (PCIe)-based communications apparatus, wherein the apparatus comprises:
a transceiver;
at least one processor; and
one or more memories coupled to the at least one processor and storing programming instructions for execution by the at least one processor to cause the communications apparatus to:
determine identity information of a second node based on information stored in a first node, wherein the second node is a destination node of first data; and
send, through the transceiver, a first transaction layer packet (TLP) to a third node, wherein the first TLP comprises the first data and the identity information of the second node, wherein the first node supports a first working mode, the first working mode is a working mode in which communication between nodes does not use a root complex.

17. The apparatus according to claim 16, wherein the first node supports the first working mode and a second working mode, and the second working mode is a working mode in which communication between nodes uses the root complex.

18. The apparatus according to claim 16, wherein the stored information further comprises identity information of the first node.

19. The apparatus according to claim 18, wherein the first TLP further comprises the identity information of the first node.

* * * * *